(12) United States Patent
Kanekawa et al.

(10) Patent No.: US 8,314,962 B2
(45) Date of Patent: Nov. 20, 2012

(54) IMAGE FORMING APPARATUS THAT DISCRIMINATES AN OPERATION OF A SERVICE REQUESTED AND CONSTRUCTS A JOB CORRESPONDING TO THE OPERATION BY SELECTING A JOB SCENARIO PREPARED IN ADVANCE

(75) Inventors: Akihiro Kanekawa, Osaka (JP); Toru Yasui, Osaka (JP); Tomonori Naota, Osaka (JP); Hiroyuki Takaishi, Osaka (JP); Takashi Toyoda, Osaka (JP); Takuya Tsuji, Osaka (JP); Katsuji Furushige, Osaka (JP); Kyoichiro Hayashi, Osaka (JP)

(73) Assignee: Kyocera Mita Corporation (JP)

( * ) Notice: Subject to any disclaimer, the term of this patent is extended or adjusted under 35 U.S.C. 154(b) by 906 days.

(21) Appl. No.: 12/308,967

(22) PCT Filed: Mar. 21, 2008

(86) PCT No.: PCT/JP2008/055219
§ 371 (c)(1),
(2), (4) Date: Dec. 30, 2008

(87) PCT Pub. No.: WO2008/123123
PCT Pub. Date: Oct. 16, 2008

(65) Prior Publication Data
US 2009/0303524 A1 Dec. 10, 2009

(30) Foreign Application Priority Data

| Mar. 23, 2007 | (JP) | 2007-76516 |
| Mar. 23, 2007 | (JP) | 2007-76517 |
| Mar. 23, 2007 | (JP) | 2007-76518 |
| Mar. 23, 2007 | (JP) | 2007-76519 |
| Mar. 23, 2007 | (JP) | 2007-76520 |
| Mar. 23, 2007 | (JP) | 2007-76521 |
| Mar. 23, 2007 | (JP) | 2007-76522 |
| Mar. 23, 2007 | (JP) | 2007-76523 |
| Mar. 23, 2007 | (JP) | 2007-76524 |
| Mar. 23, 2007 | (JP) | 2007-76525 |
| Mar. 23, 2007 | (JP) | 2007-76526 |
| Mar. 18, 2008 | (JP) | 2008-69983 |

(51) Int. Cl.
*G06F 3/12* (2006.01)
*G06K 15/00* (2006.01)
(52) U.S. Cl. .................... 358/1.15; 358/1.13
(58) Field of Classification Search .............. 358/1.1, 358/1.9, 1.12, 1.13, 1.14, 1.15, 1.18, 400, 358/500
See application file for complete search history.

(56) References Cited

U.S. PATENT DOCUMENTS
6,681,245 B1 * 1/2004 Sasagawa ................ 709/206
(Continued)

FOREIGN PATENT DOCUMENTS
JP 2-297632 12/1990
JP 766334 12/1990
(Continued)

*Primary Examiner* — Gabriel Garcia
(74) *Attorney, Agent, or Firm* — Gerald E. Hespos; Michael J. Porco

(57) ABSTRACT

An operation control program controls a computer provided in an image forming apparatus to serve as: a service section which discriminates an operation of a service requested by a user, and constructs a job corresponding to the operation by selecting one or a plurality of job scenarios prepared in advance as constituting element of the job and using the selected job scenario; and a job performing section for executing sequentially a processing indicated by each job scenario constituting the job constructed by the service section.

14 Claims, 20 Drawing Sheets

U.S. PATENT DOCUMENTS

| | | | |
|---|---|---|---|
| 7,240,348 B2 * | 7/2007 | Murase et al. | 718/102 |
| 7,907,296 B2 * | 3/2011 | Endo et al. | 358/1.15 |
| 8,068,238 B2 * | 11/2011 | Kuroshima | 358/1.1 |
| 2002/0054326 A1 | 5/2002 | Morita | |
| 2003/0063313 A1 | 4/2003 | Ito | |
| 2003/0105849 A1 | 6/2003 | Iwamoto et al. | |
| 2004/0021890 A1 | 2/2004 | Hirai et al. | |
| 2004/0194010 A1 | 9/2004 | Kirihara et al. | |
| 2006/0158675 A1 | 7/2006 | Morita | |
| 2006/0164670 A1 | 7/2006 | Morita | |

FOREIGN PATENT DOCUMENTS

| | | |
|---|---|---|
| JP | 3595665 | 5/1999 |
| JP | 3550494 | 8/1999 |
| JP | 2002-84383 | 3/2002 |
| JP | 2002-297404 | 10/2002 |
| JP | 3683542 | 10/2003 |
| JP | 2004-287859 | 10/2004 |
| JP | 2005-293407 | 10/2005 |
| JP | 2006133858 | 5/2006 |
| JP | 2006238324 | 9/2006 |
| JP | 200772170 | 3/2007 |

* cited by examiner

IMAGE FORMING APPARATUS THAT DISCRIMINATES AN OPERATION OF A SERVICE REQUESTED AND CONSTRUCTS A JOB CORRESPONDING TO THE OPERATION BY SELECTING A JOB SCENARIO PREPARED IN ADVANCE

BACKGROUND OF THE INVENTION

1. Field of the Invention

The present invention relates to an operation control program, an operation control method, and an image forming apparatus. More particularly, it relates to a technology for executing plural kinds of jobs such as copying, printing, scanning, and facsimile transmission.

2. Description of the Related Art

A complex machine, which is a kind of image forming apparatuses, uses a common hardware resource for executing plural kinds of jobs such as copying, printing, scanning, and facsimile transmission. Therefore, as compared to a case where the jobs are realized separate hardwares, a cost can be reduced, and a space can be saved.

As an example of such complex machine, as shown in JP 2002-84383, there has been disclosed an image forming apparatus in which, a universal operating system (universal OS) such as UNIX (registered trademark) is used, and a common program used for each of applications related to jobs of copying, printing, scanning, and facsimile transmission and the universal OS constitute a platform which is shared at a time of operating the applications, so that the number of program steps of each application is reduced so as to enhance program development efficiency.

However, although the technology adopted in the image forming apparatus described above reduces the number of program steps of each application and enhances the program development efficiency, it still includes separate applications for the jobs, and the platform merely bundles common functions of applications related to the jobs. Accordingly, at a time of changing a content of each job, easiness in changing a design of an application for realizing the job is not necessarily sufficient. Due to multi-functionalization of an image forming apparatus, the number of kinds of jobs increases, and the applications increase in number and get complex. Therefore, it is desired to further enhance easiness in changing a design of applications which realizes each job. It should be understood that the job mentioned herein is originally a unit of job which is to be executed by a computer according to a user's request.

SUMMARY OF THE INVENTION

The present invention was made to solve the problem described above, and its object is to enhance easiness in changing a design of an application which realizes a job at a time of changing the job, while maintaining a concept of a job which is a unit of work to be executed by a computer in accordance with a user's request.

An operation control program in accordance with an aspect of the present invention controls a computer provided in an image forming apparatus to serve as: a service section which discriminates an operation of a service requested by a user, and constructs a job corresponding to the operation by selecting one or a plurality of job scenarios prepared in advance as constituting element of the job and using the selected job scenario; and a job performing section for executing sequentially a processing indicated by each job scenario constituting the job constructed by the service section.

Further, an image forming apparatus in accordance with another aspect of the present invention includes: a memory in which a job data area is allocated; and a resource allocating section for allocating, in a case where a space of the job data area is equal to or smaller than a first predetermined amount, and before starting to execute a next job, an area having a second predetermined amount which is necessary for executing the next job and equal to or greater than the first amount in the area of the memory is allocated.

These and other objects, features and advantages of the present invention will become more apparent upon reading of the following detailed description along with the accompanied drawings.

BRIEF DESCRIPTION OF THE DRAWINGS

FIG. 17 is a flowchart showing a processing executed at a time when a power source is turned on.

DETAILED DESCRIPTION OF THE PREFERRED EMBODIMENTS

Hereinafter, an operation control program, an operation control method, and an image forming apparatus in accordance with an embodiment of the present invention will be described with reference to the drawings.

[1] Schematic Configuration of Hardware

Figure 1:
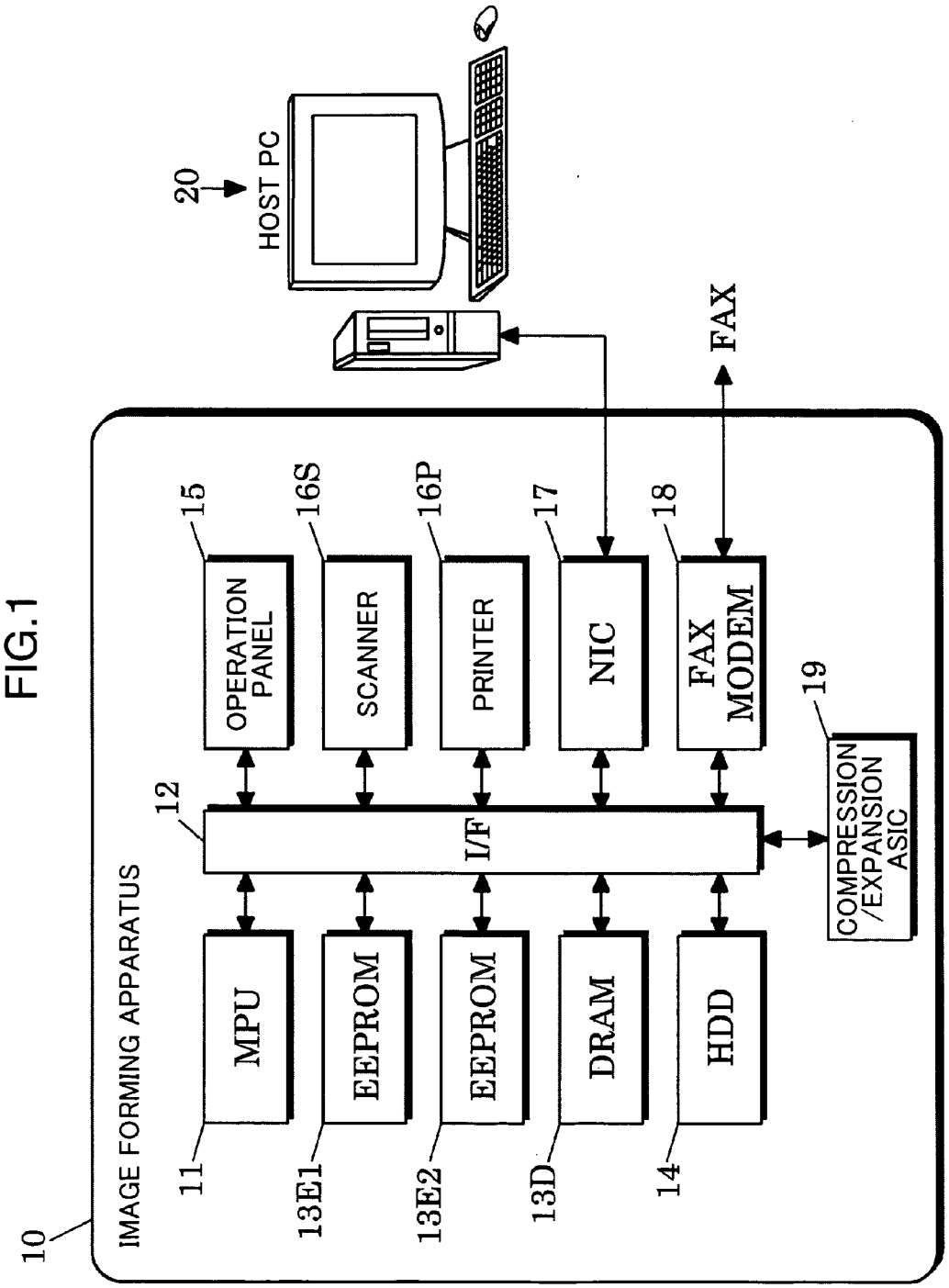
FIG. 1 is a schematic block diagram showing a hardware configuration of an image forming apparatus in accordance with an embodiment of the present invention.

FIG. 1 is a schematic block diagram showing a hardware configuration of an image forming apparatus 10 in accordance with an embodiment of the present invention.

The image forming apparatus 10 has a configuration in which an EEPROM 13E1, an EEPROM 13E2, a DRAM 13D, an HDD 14, an operation panel 15, a scanner 16S, a printer 16P, an NIC 17, a facsimile modem 18, and a compression/expansion ASIC 19 are connected to an MPU 11 through an interface 12. In FIG. 1, a plurality of interfaces are shown in one block for simplification.

The EEPROMs 13E1 and 13E2 are, for example, flash memories. The EEPROM 13E1 stores a BIOS (Basic Input Output System). The EEPROM 13E2 stores an operation control program in accordance with the embodiment of the present invention. The MPU 11 serves as sections shown in FIG. 3, which will be described hereinafter, in accordance with the operation control program stored in the EEPROM 13E2. The DRAM 13D is used as a work area. The HDD 14 as an image data storage section is used for storing data. The operation control program in accordance with the embodiment of the present invention may be stored in the HDD 14, and the MPU 11 may serve as the sections shown in FIG. 3, which will be described hereinafter, in accordance with the operation control program stored in the HDD 14.

The operation control program, in a case of being recorded in a recording medium such as a CD-ROM, a flexible disk, or the like, is stored into the HDD 14 by mounting the recording medium to an unillustrated recording medium driving device for installation. Further, in a case where the operation control program is stored in a WEB server on the internet, the operation control program may be stored into the HDD 14 by downloading a display control program from the WEB server.

The operation panel 15 includes, for example, an LCD (Liquid Crystal Display) and is operative to input a set value or an instruction and display a setting screen or a state. In the present embodiment, the operation panel 15 includes a combination of a touch panel provided in the LCD and hardware keys.

The scanner 16S as an image input section is used for inputting an image in cases of scanning, copying, and facsimile transmission. The printer 16P as an image output section includes a print engine, a fixing equipment, a sheet-feeding section, a sheet-conveying section, and a sheet-discharging section. The printer 16P forms an electrostatic latent image is formed on a photoconductive drum of a print engine in accordance with bitmap data generated by applying an image processing to print data, develops the electrostatic latent image with toners, transfers and fixes the image onto, and discharges the sheet.

The NIC (Network Interface Card) 17, as a part of the image input section and the image output section, is connected to a host computer 20 through a cable or a wireless communication medium and used for a print job, electronic mail transmission/reception, internet facsimile transmission, and remote operation of the operation panel 15 through a browser. The facsimile modem 18 is used for facsimile transmission/reception.

The compression/expansion ASIC 19 is used as a co-processor of the MPU 11, and it includes, for example, two ports for compressing and expanding an image and is capable of executing four parallel processings at maximum.

[2] Software Designing Concept

Firstly, a software designing concept will be described.

In a complex machine as one of conventional image forming apparatuses, applications for executing operations corresponding to user services such as a printing operation, a copying operation, and a facsimile operation have been provided separately. In other words, one application corresponds to one of the user services, and the complex machine uses one application to execute a job for providing the user service. However, since a common management and control is partially present in each of the applications, it is wasteful to provide the common management and control for each application. Accordingly, in the present embodiment, a job which is requested by a user for operation in the complex machine is planned by combining each part as an element of the job (a job scenario which will be described hereinafter), so that executing the job allows an operation desired by a user to be performed. It should be understood that a job is a unit of work which is requested by a user for execution in a computer.

In the present embodiment, a job is divided into parts (job scenarios or basic jobs which will be described hereinafter) and expressed by a combination of the parts. In other words, in the present embodiment, a job is expressed with (1) a combination of the parts and (2) an execution order of these, and the job is executed by sequentially executing one or a plurality of parts in accordance with (1) and (2). Accordingly, it can avoid a content of each application from being complex due to creating an application for each job. Further, in a case where it is necessary to increase the number of kinds of jobs, add or change a function due to multi-functionalization, it becomes easy to change a design of a program.

Further, the operation control program in accordance with the present embodiment is multi-layered for respective functions, so that it further becomes easy to change a design. The operation control program in accordance with the present embodiment is divided into a service layer, a job layer, and an element layer so as to be multi-layered.

In the operation control program in accordance with the present embodiment, each of the service layer and the job layer is further multi-layered for particular functions, so that it becomes easy to change a design.

Furthermore, under the element layer of the operation control program in accordance with the present embodiment, there is provided a middleware layer. The middleware layer includes a basic program which is operative to enable the operation control program to control (hereinafter, referred to as "operation") a hardware according to a state in a relatively easy manner independent of a kind of machine. The presence of this middleware layer simplifies the operation control program in accordance with the present embodiment, so that it becomes easy to change a design.

However, if the operation control program in accordance with the present embodiment is multi-layered in such manner to make it easy to change a design of a program corresponding to a job, an interchange of instructions and signals between the layers becomes complex. Therefore, as described hereinafter, the operation control program in accordance with the present embodiment executes a service without using the job layer, simplifies a transmission of job information, and integrates directions of transmitting an instruction and a notification, in accordance with a service requested by a user for execution (simplifying transmission of an instruction), so that it becomes easy to change a design of a program.

Hereinafter, functions of the MPU 11 realized by an operation in accordance with the operation control program of the embodiment of the present invention will be described.

Figure 2:
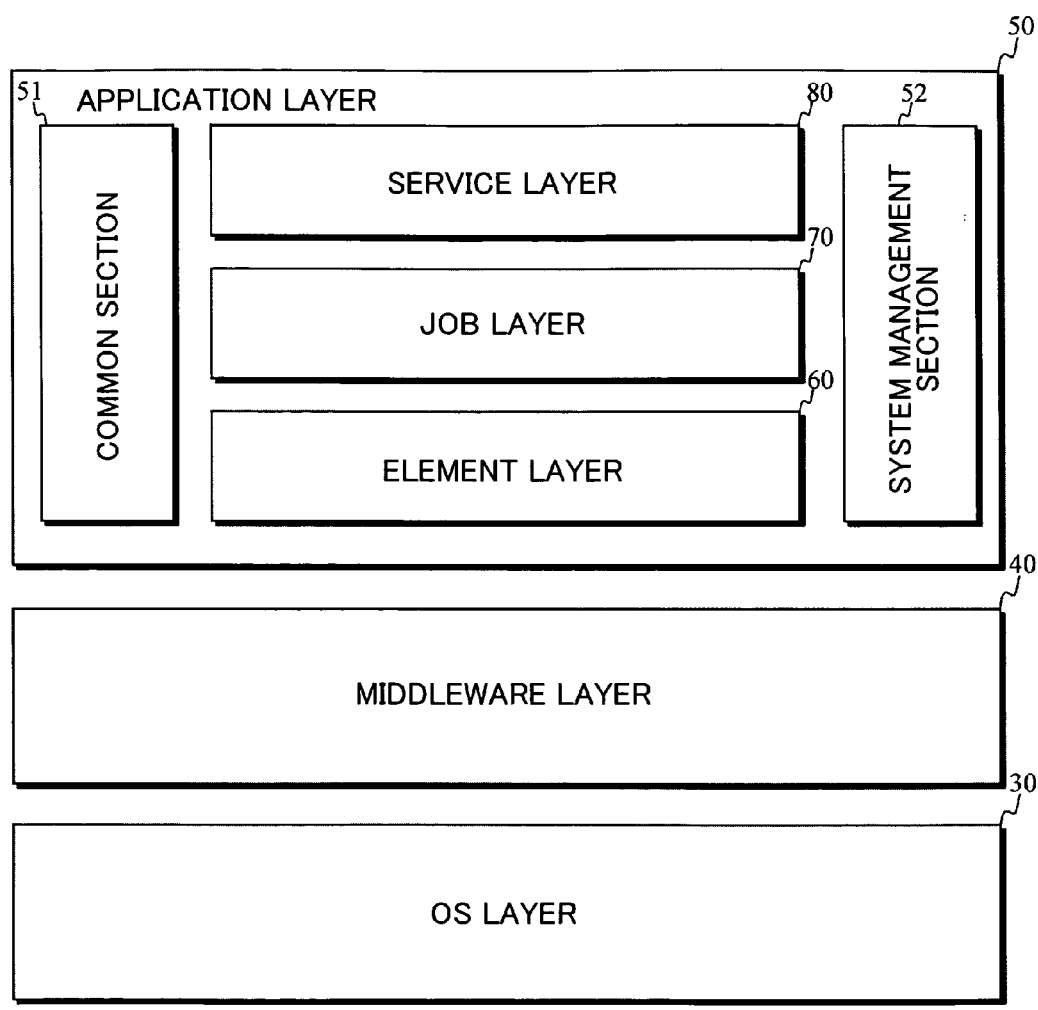
FIG. 2 is a schematic block diagram showing a hierarchical structure of an operation control program in accordance with the embodiment of the present invention.

[3] Hierarchical Structure of the Operation Control Program in Accordance with the Embodiment of the Present Invention FIG. 2 is a schematic block diagram showing a hierarchical structure of the operation control program in accordance with the embodiment of the present invention. In particular, the hierarchical structure is realized by an operation control executed by the MPU 11 in accordance with the operation control program of the embodiment of the present invention. Hereinafter, the hierarchical structure to be realized by the operation control executed by the MPU 11 will be described as a software hierarchical structure.

The software hierarchical structure includes an application layer 50, a middleware layer 40, and an OS (Operating System) layer 30. The OS layer 30 is the lowermost layer, and the application layer 50 is present above the OS layer 30 through the middleware layer 40. The application layer 50, the middleware layer 40, and the OS layer 30 are sections realized by the operation control program in accordance with the present invention.

The application layer 50 includes a common section 51, a system management section 52, a lower element layer 60, a middle job layer 70, and an upper service layer 80.

The service layer (service section) 80 is operative to receive a service request from a user and provides a service to the user through the job layer 70 and the element layer 60. As described above, among the services received by the service layer 80, there are ones which are executed by the element layer 60 or the system management section 52 without the job layer 70. Accordingly, these services are named as "work" to be distinguished from "job." Each service corresponds to a job or a work, and the job is executed by the job layer 70. The job includes one or a plurality of job scenarios (basic jobs). Further, the job scenario (basic job) includes one or a plurality of job steps. The job step is executed by the job layer 70 with use of the element layer 60 as needed.

Figure 3:
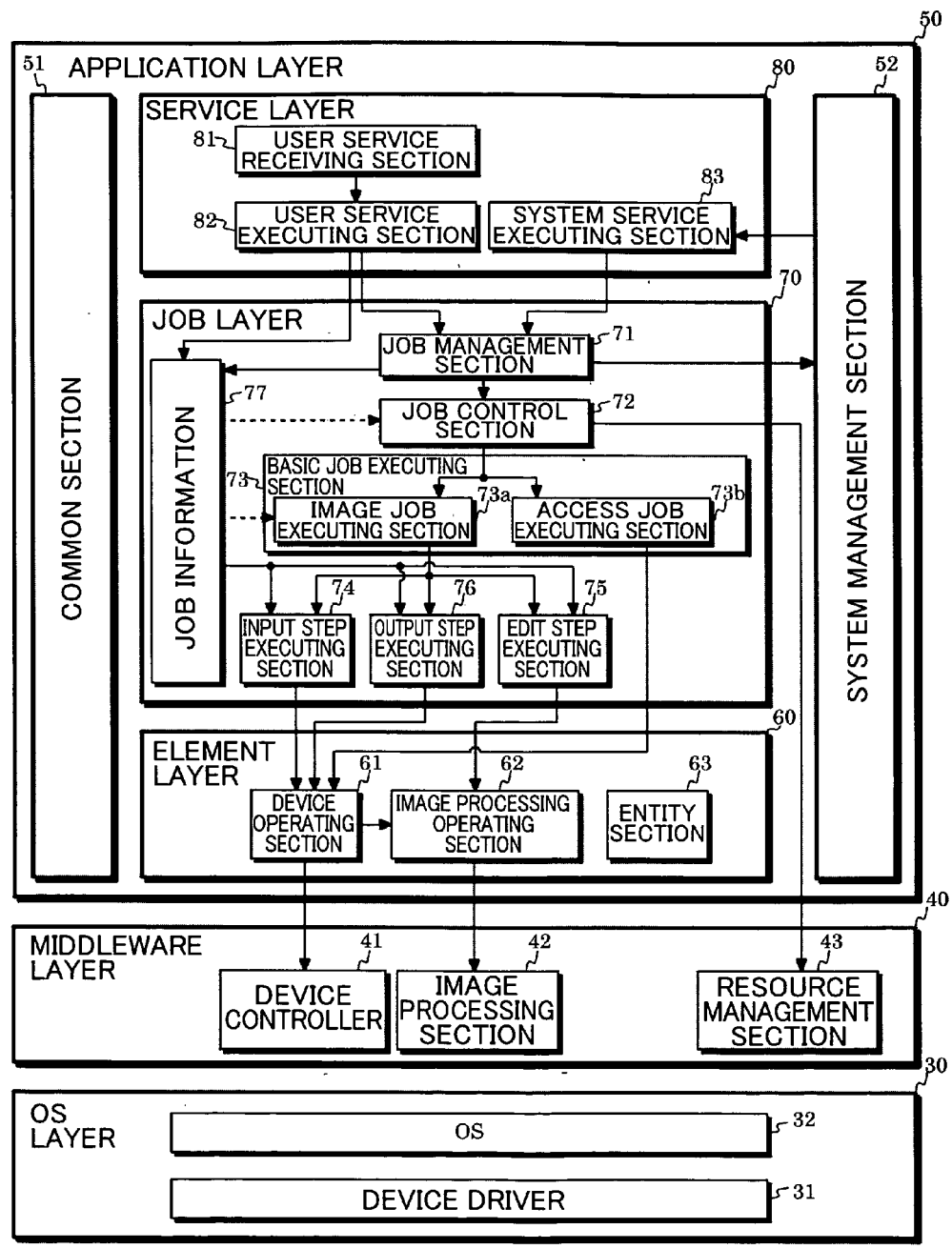
FIG. 3 shows functional sections included in layers of the operation control program in accordance with the embodiment of the present invention.

FIG. 3 shows functional sections included in the layers. Each functional section is realized by an operation executed by the MPU 11 in accordance with the operation control program. The lines with arrows in FIG. 2 show flows of main processes.

[4] OS Layer

The OS layer 30 includes a device driver 31 dependent on a hardware, and an OS 32. The device driver 31 is positioned under the OS 32 and registered to the OS 32. The OS 32 is universal, and its kernel is, for example, Linux (registered trademark).

[5] Middleware Layer

The middleware layer 40 includes a device controller 41, an image processing section 42, and a resource management section 43.

The device controller 41 controls the operation panel 15, the scanner 16S, the printer 16P, the NIC 17, and the facsimile modem 18 through the device driver 31, and receives device state notifications from these devices.

The image processing section 42 executes processing of controlling the compression/expansion ASIC 19, enlarging, reducing, and rotating an image, and an RIP (Raster Image Processor).

The resource management section 43 allocates a resource in accordance with a resource request queue for each resource, and deallocates the resource if the allocated resource is in non-use.

[6] Application Layer

Hereinafter, the application layer 50 will be described.

The application layer 50 includes the common section 51, the system management section 52, the service layer 80, the job layer 70, and the element layer 60.

[6-1] Common Section 51

The common section 51 includes a program which is used in common in the system management section 52, the element layer 60, the job layer 70, and the service layer 80, and a program which determines whether or not a set value (for example, a prohibited setting (algorithm) in combinations of functions in scanner setting and sheet feeding/discharging setting) dependent on a kind of machine satisfies a prescribed condition. The common section 51 simplifies programs of the system management section 52, the element layer 60, the job layer 70, and the service layer 80 and makes them be non-dependent on a kind of machine, so that it becomes easy to change a design.

[6-2] System Management Section 52

The system management section 52 manages a system state and executes a user authentication/authorization processing. In other words, the system management section 52 handles a part of a log-in processing and an approval/denial processing with respect to a service request after the log-in. Further, in a case where an error occurs in a system provided in the image forming apparatus 10, the system management section 52 distributes notifications to relevant parts.

[7] Element Layer

The element layer (element section) 60 includes functional sections of a device operating section 61, an image processing operating section 62 and an entity section 63.

The device operating section 61 corresponds to the device controller 41 of the middleware layer 40. The device operating section 61 operates the device controller 41 in accordance with a state of each device (each equipment) notified by the device controller 41.

The image processing operating section 62 corresponds to the image processing section 42 of the middleware layer 40. The image processing operating section 62 executes a processing such as generating intermediate data, and controls the image processing section 42 to execute processing of compression, expansion, enlargement, reduction, rotation, and RIP with respect to an image.

The device operating section 61 and the entity section 63 are operative to control or operate an image input section and an image output section.

The entity section 63 retains and manages data.

[8] Job Layer

The job layer (job performing section) 70 manages execution of a job. The job layer 70 starts up a program in one of functional sections of the element layer 60, or sequentially starts up programs in a plurality of functional sections of the element layer 60, for execution of a job.

The job layer 70 includes step executing sections such as a job management section 71, a job control section 72, a basic job executing section 73, step executing sections, such as an input step executing section 74, an edit step executing section 75, and an output step executing section 76, and a job information storage section (storage section) 77 accessible from those. For convenience in description, the one including the job management section 71 and the job control section 72 is named as "applied job layer", and the one including the basic job executing section 73, the input step executing section 74, the edit step executing section 75, and the output step executing section 76 is named as "basic job layer".

Figure 4:
FIG. 4 shows elements constituting job information.

The job management section 71, in accordance with a job start request from the service layer 80, copies setting information (information including a parameter which is necessary for executing a job and having a data structure used in common in each job) of the job at a time of the job start request to generate job information. However, it is sufficient that the setting information to be copied by the job management section 71 includes only a part corresponding to the job requested by a user and subjected to execution. The job information includes a job ID, a job scenario identifier, and job setting information. FIG. 4 shows elements constituting the job information. The job management section 71 allows the resource management section 43 to obtain a hardware resource necessary for executing a job scenario (basic job) constituting the job, and thereafter gives a job control instruction such as executing, changing in order, aborting, restarting, or cancelling of a job to the job control section 72.

The job control section 72 responds to the job control instruction from the job management section 71, and in a case where the instruction relates to execution of a job execution, it instructs the basic job executing section 73 to sequentially execute a processing of a job scenario constituting the job.

The job scenario is a series of processing necessary for performing an operation of the image forming apparatus 10, and it is constituted by a combination of job steps and an execution order of the job steps. For example, in a case where a unit of operation of reading a document in the scanner 16S and storing in the HDD 14 is named as "Scan To Box", the job scenario includes a combination of job steps necessary for executing the Scan To Box and an execution order of the job steps. In the present embodiment, various jobs are constructed by one or a combination of a plurality of job scenarios. Further, a job scenario which is adapted for executing a basic operation executed in plural kinds of jobs in common and used in common in constructing plural kinds of jobs is named as a basic job. The job scenario may include a conditional branch command for selecting a job step to be executed in accordance with a condition. For example, the job scenario, in case of waiting for an output resource, may change another output resource, which can be outputted, to be an output resource for performing the output so as to quickly perform the output.

The basic job executing section 73 executes the basic job. The basic job executing section 73 includes an image job executing section 73a and an access job executing section 73b. The basic job executing section 73 responds to a basic job executing instruction outputted from the job control section 72, and starts up the image job executing section 73a if the basic job relates to an image processing, or starts up the access job executing section 73b if the basic job does not relate to an image processing.

The image job executing section 73a, in accordance with a content of a job scenario (basic job), starts up the input step executing section 74, the edit step executing section 75, or the output step executing section 76 to sequentially execute each job step constituting the job scenario (basic job) for each page.

The access job executing section 73b allows the device operating section 61 or the entity section 63 in the element layer 60 to execute a basic job including no image processing. The access job executing section 73b allows, for example, the device operating section 61, the device controller 41, the device driver 31, and the NIC 17 to execute a processing of notifying a certain conditional change with an electronic mail.

The input step executing section 74, in accordance with an instruction from the image job executing section 73a, executes a job step related to an image input through the device operating section 61 or the entity section 63. The input step executing section 74 executes a processing of allowing the scanner 16S to read document image data through, for example, the device operating section 61, the device controller 41, and the device driver 31. Further, the input step executing section 74 executes a processing for obtaining a printing file from the entity section 63 as an input step in a case of, for example, transmitting the printing file retained by the entity section 63 through the facsimile modem 18.

The edit step executing section 75 executes a job step related to an image editing performed through the image processing operating section 62. The edit step executing section 75 executes a processing of enlargement, reduction, rotation, and the like with respect to unedited print data through, for example, the image processing operating section 62 and the image processing section 42.

The output step executing section 76 allows the device operating section 61 or the entity section 63 to execute a job step related to an image output. The output step executing section 76 executes a processing of allowing the printer 16P to print data through, for example, the device operating section 61, the device controller 41, and the device driver 31.

[9] Service Layer

The service layer 80 includes an upper user service receiving section 81, a lower user service executing section 82, and a lower system service executing section 83.

The user service receiving section (a service request receiving section, a service specifying section, a job scenario selecting section) 81 receives a request for executing each operation of the image forming apparatus 10 from a user through, for example, an event notification, and determines what the request from the user is. To meet the request, the user service receiving section 81 instructs the user service executing section 82 to execute a service indicated by the request.

In particular, firstly, the user service receiving section 81 receives a request from the user at the operation panel 15, the NIC 17, or the facsimile modem 18 through the device driver 31, the device controller 41, and the device operating section 61. Then, the user service receiving section 81 analyzes the received request, determines a job corresponding to an operation indicated by the request, and then selects a job scenario necessary for constituting the job from job scenarios stored in the job information storage section 77. The job information storage section 77 stores job scenarios corresponding to basic operations performed in the image forming apparatus 10. Further, the job information storage section 77 stores identifiers (for example, "Scan To Box" and the like), which are adapted for identifying the job scenarios, provided to the job scenarios. The user service receiving section 81 reads an identifier of each selected job scenario from the job information storage section 77 and gives the identifier to the user service executing section 82, so as to instruct the user service executing section 82 to execute the service.

The operations of the image forming apparatus 10 requested by the user, in other words, the requested services include copying, facsimile transmission, electronic mail transmission, maintenance, software update, and the like. However, in a case where simple service requests of displaying or changing data such as setting information (for example, job log information, department management information, document box information, status information, address book information, and machine information) retained by the entity section 63 is received, execution of a service is not instructed to the user service executing section 82 but is instructed directly to the entity section 63 for the purpose of avoiding complication of application.

The user service executing section (job scenario selecting section) 82 responds to a service executing instruction from the user service receiving section 81, gives an identifier of each job received as the service executing instruction to the job management section 71, and further instructs the job management section 71 to start the job, so that the processing for executing the service is performed. The user service executing section 82 determines an execution order of each job scenario selected by the user service receiving section 81 so as to construct the job.

The system service executing section 83 receives a request for using each mechanism of the image forming apparatus 10 through the system management section 52, and executes a service by calling up the job management section 71. In the present embodiment, the system service executing section 83 receives a request from the system including only a notification service which will be described hereinafter. However, it may be so designated that other service requests, for example, services such as transmitting a facsimile or performing maintenance automatically at a predetermined time are received.

The system service executing section 83, when it receives a notification related to each mechanism or a change in condition of the image forming apparatus 10 from the system management section 52, instructs the job management section 71 to execute the notification job in accordance with the setting information stored in the entity section 63. The notification job is a normal job which is independent and individual, and notifies occurrence of an event to a user through a set notification means at a time when, for example, an error occurs during the job is executed or facsimile transmission is completed. The setting information includes necessity of notification to a user, an event which should be notified, notifying means such as printing and electronic mail, and an addressee in a case of an electronic mail. The setting information can be changed through the operation panel 15.

Hereinafter, a processing executed by the operation control program in accordance with an embodiment of the present invention, especially a flow of processing to be executed by the application layer 50 in accordance with various service requests will be described.

[10] Print Service Execution Flow

Figure 5:
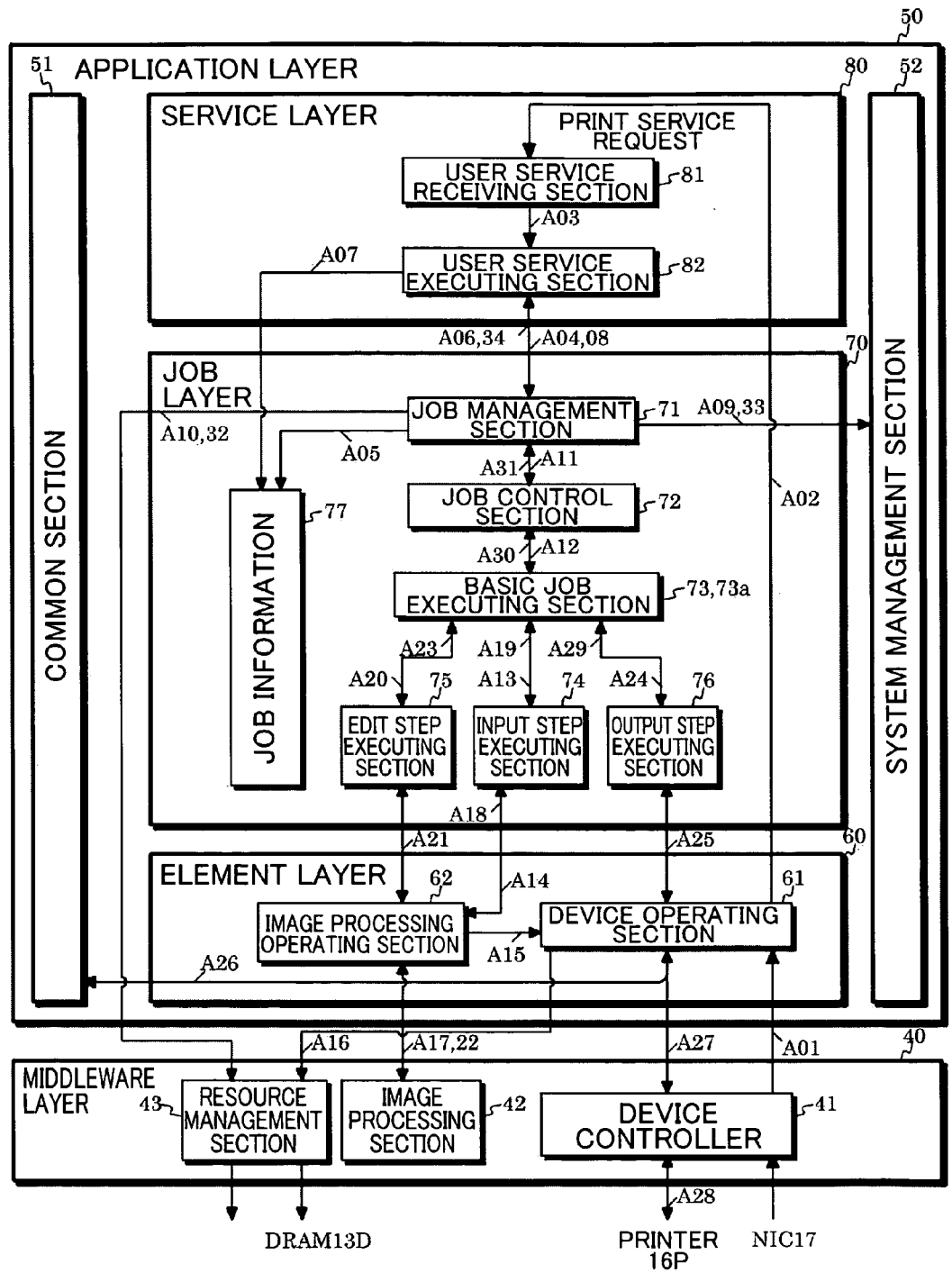
FIG. 5 shows a flow of executing a print service.

FIG. 5 shows a flow of executing a print service. The lines with arrows connecting functional sections in FIG. 5 show states of transmission/reception of instructions between the functional sections. Hereinafter, the numbers in parenthesis indicate the reference numerals of executing instructions shown in FIG. 5.

(A01, A02) By an event driven, print data from the host computer 20 is stored in a buffer area of the DRAM 13D allocated by the resource management section 43 through the NIC 17 and the device driver 31. On the other hand, through the device controller 41 and the device operating section 61, a print service execution request and data identifying information for specifying the print data stored in the buffer area of the DRAM 13D are notified to the user service receiving section 81.

(A03) Since the notification at this time is a print service execution request, the user service receiving section 81 selects one or a plurality of job scenarios necessary for constituting a job of a print service. The user service receiving section 81 gives an identifier of each selected job scenario and the above-described setting information (for example, refer to FIG. 4) for executing a job corresponding to the service to the user service executing section 82 so as to instruct the user service executing section 82 to execute the print service (start up the user service executing section 82). The setting information includes the data identifying information and current set value which is set in the EEPROM 13E2 as data necessary for executing the print job.

Figure 6:
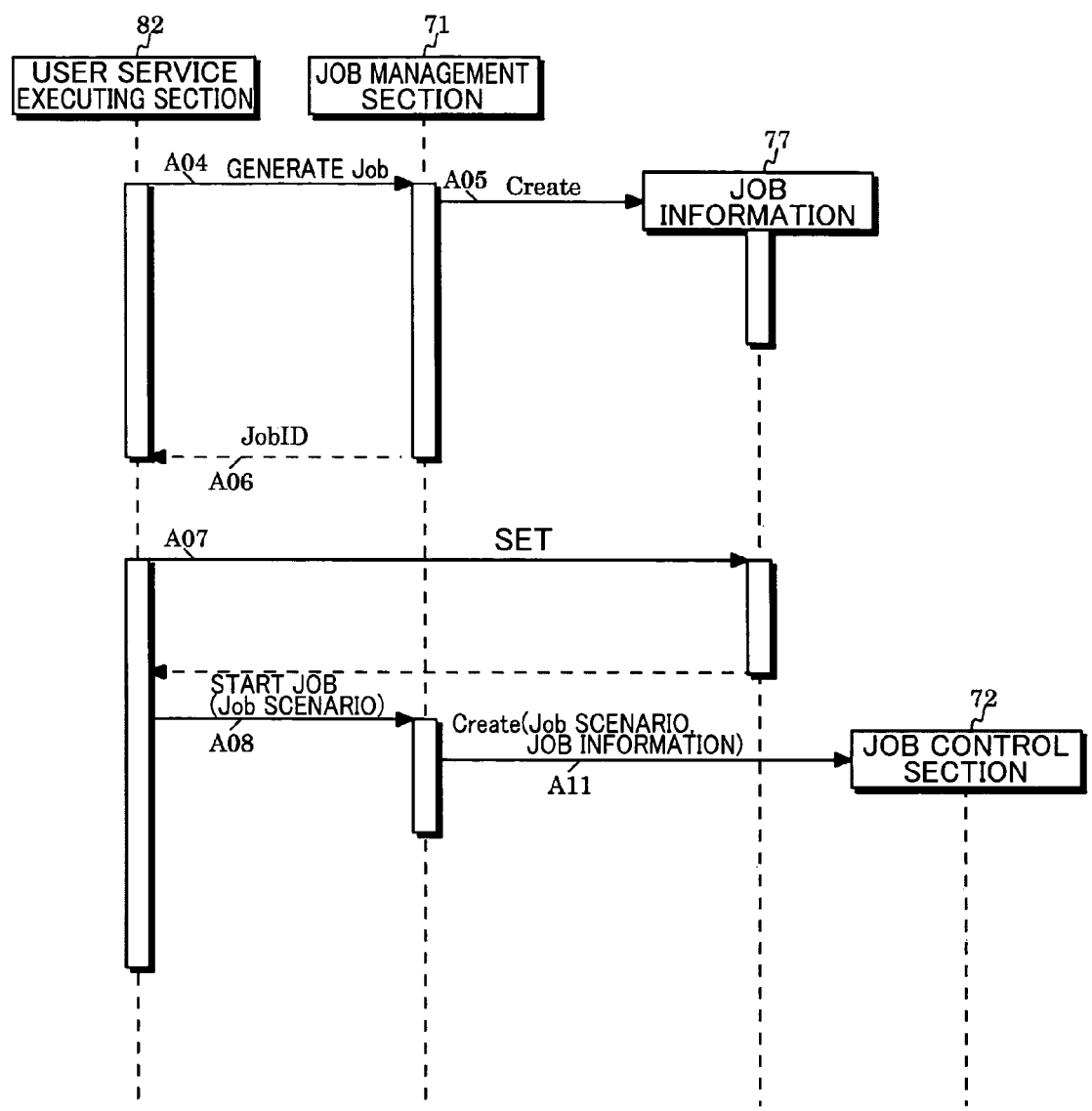
FIG. 6 is a sequence diagram showing an operation of a user service executing section.
Figure 7:
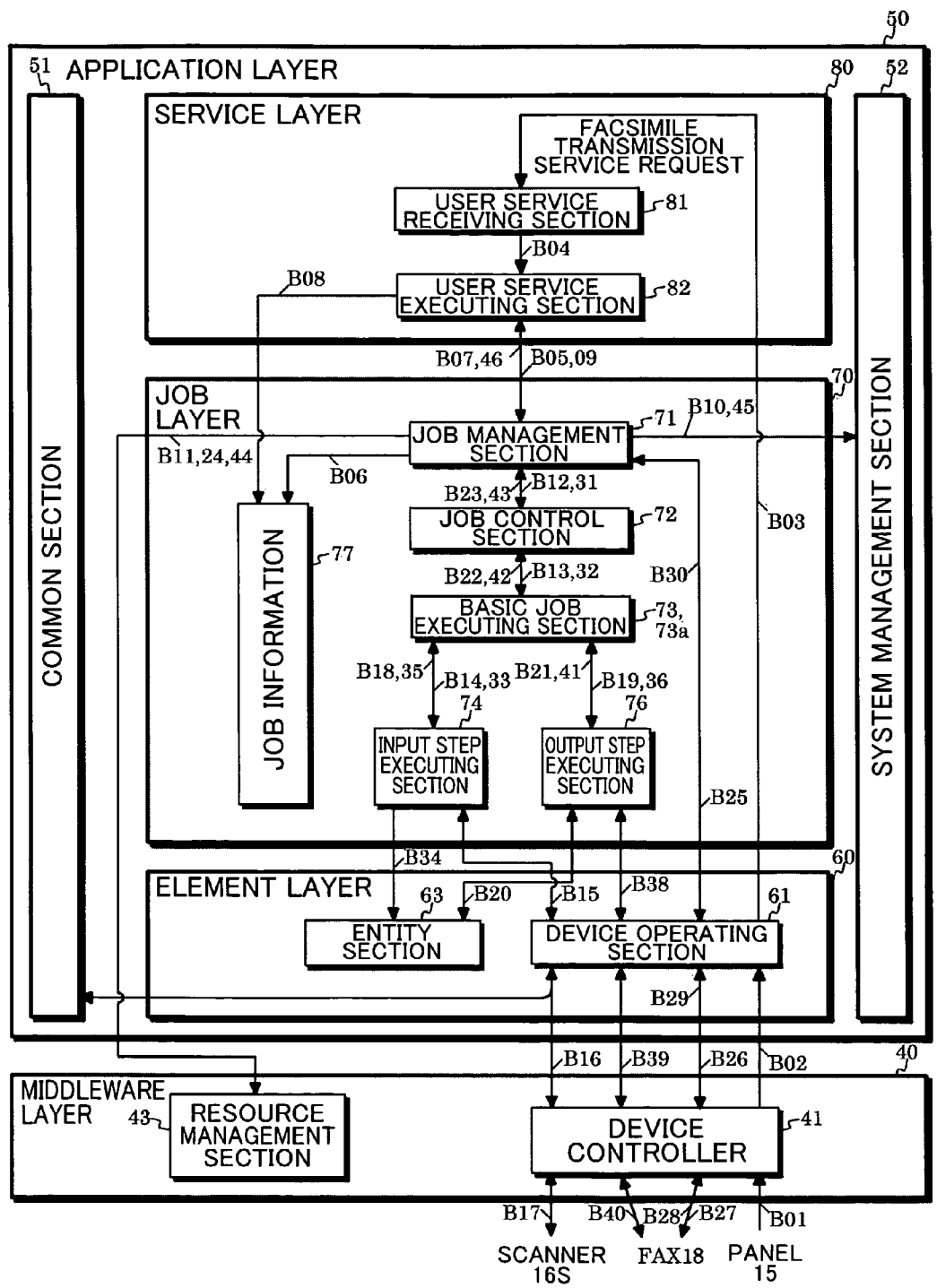
FIG. 7 shows a flow of executing a facsimile transmission service.

The user service executing section 82 responds to the print service executing instruction from the user service receiving section 81 and executes the operation shown in the sequence diagram of FIG. 6, so as to execute the print service. Hereinafter, the operation will be described specifically.

(A04) The user service executing section 82 determines an execution order of each job scenario indicated by the identifier received from the user service receiving section 81. Accordingly, a job scenario constituting the print job is constructed. Next, the user service executing section 82 starts up the job management section 71, and gives the print job, which is configured by identifiers of job scenarios and execution order information of the job scenarios received from the user service receiving section 81, to the job management section 71 to instruct starting of the print job.

(A05) In response to this, the job management section 71 generates in the job information storage section 77 an instance of initialized job information regarding the print job. The instance has a default value of job information. Next, the job management section 71 allocates a job ID to the received print job, and writes the job ID, the identifier of the job scenario, and the execution order of the job scenario to the job information.

(A06) The job management section 71, after completing generating and writing of the job information, notifies the job ID to the user service executing section 82.

(A07, A08) The user service executing section 82 writes the setting information received from the user service receiving section 81 to the job information having the job ID received from the job management section 71. Next, the user service executing section 82 instructs the job management section 71 to start the print job.

(A09-A11) In response to this, the job management section 71 notifies starting of the job to the system management section 52 along with the job ID. Further, the job management section 71 reads job information having the job ID from the job information storage section 77, obtains the identifier of the job scenario constituting the print job, and analyzes a content of the job scenario indicated by the identifier, so as to specify various resources necessary for execution of the job scenario. Then, the job management section 71 requests the resource management section 43 to obtain a resource specified as being necessary for execution of the job scenario, in other words, to obtain a hardware resource such as a memory and the compression/expansion ASIC 19. The job management section 71, after obtaining the hardware resource, gives the job ID to the job control section 72, so as to instruct a control of the print job.

(A12) In response to this, the job control section 72 reads the identifier of the job scenario, which is written in the job information having the received job ID, from the job information storage section 77, and gives the identifier to the basic job executing section 73, and gives an instruction of executing the job scenario indicated by the identifier. In the present embodiment, the print job requested by a user for execution is configured by a job scenario including one basic job. Accordingly, the job control section 72 executes this basic job only. However, for example, in a case where a job requested by a user for execution is constituted by a plurality of basic jobs and job scenarios, the job control section 72 gives an instruction of executing one basic job or job scenario in accordance with an execution order of the basic job and the job scenario determined by the user service executing section 82, and after the execution is completed, instructs a job scenario of next basic job for execution, so that each of a plurality of basic jobs and job scenarios is instructed to be sequentially executed.

In the conventional technology, at a time of executing a job, a job execution instruction is transmitted sequentially to the middleware layer 40 in the program layers, and then a hardware resource such as a memory necessary for the job is obtained. Accordingly, if the job is cancelled when it is in a waiting state since a hardware resource cannot be obtained, the preceding processing is wasted. However, in the present embodiment, the job management section 71 allows the resource management section 43 to obtain a hardware resource, and thereafter instructs the job control section 72 to execute a basic job. Accordingly, an effect of eliminating the waste of processing can be achieved.

Next, in response to the basic job execution instruction, the basic job executing section 73 transmits an identifier indicating a job scenario received from the job control section 72 to the image job executing section 73a to instruct execution of the basic job indicated by the identifier, and starts up the image job executing section 73a. In response to this, the image job executing section 73a refers to the job information storage section 77 to analyze contents of the basic job instructed to be executed, and then following this to execute a sequence control of job steps with respect to the step executing sections 74-76 as described herebelow.

In other words, the image job executing section 73a instructs the step executing sections 74-76 to sequentially execute a plurality of job steps (for example, job steps of image input, image processing (omitted in some cases), and image output) constituting the basic job instructed by the basic job executing section 73 for execution in accordance with a job scenario which is the basic job. Herein, the case is described in which the job control section 72 instructs the basic job executing section 73 for execution, and the basic job executing section 73 starts up the image job executing section 73a to instruct execution of the job steps. However, the job control section 72 may directly start up the image job executing section 73a to instruct execution of the job steps.

(A13) In the sequence control, the image job executing section 73a, firstly, gives an instruction for executing each job step and the job ID to the input step executing section 74 in accordance with the execution order indicated by the instructed basic job, and starts up the input step executing section 74.

(A14) In response to this, the input step executing section 74 reads from job information having the received job ID the setting information corresponding to a kind of job (herein, a print job) written in the job information, and gives the data identifying information (information for specifying print data) included in the setting information to the image processing operating section 62 based on this, and starts up the image processing operating section 62.

(A15-A18) In response to this, the image processing operating section 62, firstly, gives the data identifying information to the device operating section 61, and allows the device operating section 61 to obtain print data indicating the data identifying information among print data in the buffer area allocated by the resource management section 43, and sequentially analyzes the print data, and writes predetermined information (information necessary for executing print services such as image processing and print-out processing with regard to the print data), which is included therein, into the job information. After that, the image processing operating section 62 allows the image processing section 42 to sequentially create unedited print-out page data. Then, the image processing operating section 62, at each time when print-out page data for one page is created, notifies completion of creating to the input step executing section 74, and gives an identifier indicating the created page data to the input step executing section 74.

(A19) The input step executing section 74, when it receives the identifier of the created page data from the image processing operating section 62, notifies in response the completion of creating the page data to the image job executing section 73a in the basic job executing section 73 and gives the identifier of the created page data.

(A20) The image job executing section 73a, when it receives the identifier of the created page from the input step executing section 74, gives in response the identifier and job ID of the created page data in accordance with the basic job to the edit step executing section 75 and starts up the same. In the basic job constituting the print job described here, the processing of A20 is executed. However, in other job scenario, there is a case of not starting up the edit step executing section 75. In such case, the processing of A20 through A23 are not executed, and the routine proceeds to step A24.

(A21-A23) The edit step executing section 75, when it receives the identifier and job ID of the created page data from the image job executing section 73a, reads in response the predetermined setting information (information necessary for executing print services such as image processing and print-out processing with regard to the print data) from job information indicated by the job ID, and outputs image processing executing instruction to the image processing operating section 62 based on this, and allows the image processing operating section 62 to call out a corresponding method of the image processing section 42 and execute image-editing such as enlargement, reduction, and rotation with respect to the page data. When the image-editing executed by the image processing operating section 62 and image processing section 42 is completed, and the edit step executing section 75 receives a notice regarding image-editing with respect to the page data from the image processing operating section 62, the edit step executing section 75 notifies the identifier of the created page data and completion of image-editing of the page data to the basic job executing section 73 and the image job executing section 73a.

(A24) The image job executing section 73a, when it receives the notice regarding completion of image-editing with respect to the page data, gives the identifier indicating the edited page data and a job ID of the job to the output step executing section 76 in accordance with the basic job, and starts up the output step executing section 76.

(A25) The output step executing section 76, when it receives the identifier indicating the edited page data and the job ID from the image job executing section 73a, reads in response the predetermined setting information from the job information having the job ID, and starts up the device operating section 61 based on this.

(A26-A28) The device operating section 61, in response to the instruction from the output step executing section 76, calls out the common section 51 to determine whether or not the predetermined setting information satisfies the condition dependent on a kind of machine. If the common section 51 makes a positive determination, the device operating section 61 executes the printing processing with respect to a sheet through the device controller 41 in accordance with the setting information. Further, if the common section 51 makes a negative determination, the device operating section 61 terminates its processing without executing the printing processing, or executes the printing processing in accordance with alternative information of the setting information obtained from the common section 51.

(A29) When the printing processing executed by the device operating section 61 and device controller 41 with respect to all pages is completed, and the output step executing section 76 receives the completion notice from the device operating section 61, the output step executing section 76 notifies the completion to the image executing section 73a of the basic job executing section 73.

(A30) When the image job executing section 73a receives the notice regarding completion of printing with respect to all pages from the output step executing section 76, it refers to a basic job to determine whether or not execution of all of the job steps is completed, and gives a notice regarding completion of the basic job to the job control section 72 if it is determined that execution of all of the job steps is completed, in other words, if it is determined that execution of the basic job is completed.

(A31) The job control section 72, in response to this, gives a notice regarding completion of the basic job along with a job ID regarding the basic job to the job management section 71.

(A32-34) The job management section 71, in response to this, allows the resource management section 43 to deallocate the hardware resource obtained at the time of starting the job. Then, the job management section 71 deletes from the job information storage section 77 the job information indicated by the received job ID and gives a notice regarding completion of the job along with the job ID to the system management section 52 and user service executing section 82.

As described above, job information having a data structure which is common for all kinds of jobs is provided, and in programs of the input step executing section 74, the edit step executing section 75, and the output step executing section 76 using the job information, the predetermined setting information associated with kinds of jobs retained by the job information is obtained from the job information. Accordingly, a program configuration becomes simple, so that an effect of easily changing a design can be achieved.

Further, the image job executing section 73a instructs execution to each of step executing section s 74-76 in accordance with a basic job (job scenario) constituting a job requested by a user for execution. Accordingly, without changing details of a program in each of step executing sections 74-76, new kind of job can be easily created by only changing contents of the basic job (job scenario), so that an effect of easily changing a design can be achieved.

[11] Facsimile Transmission Service Execution Flow

FIG. 6 shows a flow of executing the facsimile transmission service, in which functional sections are connected by lines with arrows.

(B01, B02) At a time of requesting the facsimile transmission service, a user operates the operation panel 15 to perform setting regarding a facsimile addressee and the like, and presses a start button of the operation panel 15. The device driver 31 detects a key pressed by the user at the operation panel 15, and supplies a code corresponding to the pressed key to the device controller 41. The device controller 41 performs a state transition based on a state and an input key code to tokenize the input information, and supplies the tokenized input information to the device operating section 61.

(B03) The device operating section 61 interprets a request and a set value in accordance with the tokenized input information, and supplies the same to the user service receiving section 81.

(B04) In response to this, the user service receiving section 81 selects a job scenario constituting a job of facsimile transmission, and gives the user service executing section 82 an identifier of the selected job scenario and the setting information (example shown in FIG. 4) for execution of the job of the facsimile transmission service to instruct execution of the facsimile transmission service.

(B05) In response to this, the user service executing section 82 determines an execution order of each job scenario indicated by the identifier received from the user service receiving section 81. Accordingly, a job scenario constituting the facsimile transmission job is constructed. Next, the user service executing section 82 starts up the job management section 71, and gives the facsimile transmission job which is constituted by the identifier of each job scenario and execution order information of the job scenario received from the user service receiving section 81 to the job management section 71 to instruct starting of the facsimile transmission job.

(B06, B07) In response to this, the job management section 71 generates an instance of initialized job information in the job information storage section 77. Next, the job management section 71 allocates a job ID to the received facsimile transmission job and writes the job ID and the identifier of each job scenario constituting the facsimile transmission job into the job information. The job management section 71 gives a notification regarding the job ID to the user executing section 82 if generating and writing of the job information is completed.

(B08, B09) The user service executing section 82 writes the setting information (for example, refer to FIG. 4) received from the user service receiving section 81 into the job information having the job ID received from the job management section 71. Next, the user service executing section 82 instructs starting of the facsimile transmission job to the job management section 71.

(B10-B12) In response to this, the job management section 71 gives a notice regarding starting of a job along with the job ID to the system management section 52. Further, the job management section 71 reads job information having the job ID from the job information storage section 77, obtains the identifier of each job scenario, analyzes contents of each job scenario indicated by the identifier, and specifies various resources necessary for execution of the job scenario. Then, the job management section 71 requests the resource management section 43 to obtain a hardware resource of a resource (such as an area in the DRAM 13D and the scanner 16S) which is specified as being necessary for executing a job scenario which is a job scenario (a basic job of ScanToBox which will be described hereinafter) constituting the facsimile transmission jobs and executed firstly. After obtaining the hardware resource, the job management section 71 gives the job ID to the job control section 72 and gives an instruction to start controlling the facsimile transmission job.

(B13) In response to this, the job control section 72 reads from the job information storage section 77 an identifier of a basic job (here, it is a basic job of ScanToBox) to be executed firstly among identifiers written in the job information having the received job ID and gives the identifier to the basic job executing section 73, and gives an instruction to execute the job scenario (here, it is a basic job of ScanToBox) indicated by the identifier.

Here, the facsimile transmission job is constituted by a ScanToBox basic job and a BoxToFax basic job, and an execution order of executing the ScanToBox basic job and thereafter executing the BoxToFax basic job is set. In other words, the facsimile transmission job is a combination of the ScanToBox basic job of reading a document image from the scanner 16S and putting the file into a box (directory) and the ScanToFax basic job of calling out an addressee, taking out the file from the box, and transmitting a facsimile.

The basic job executing section 73, in response to the basic job execution instruction, transmits to the image job executing section 73a the identifier indicating the basic job received from the job control section 72 so as to instruct execution of the basic job indicated by the identifier, and starts up the image job executing section 73a. The image job executing section 73a, in response to this, refers to the job information storage section 77, and analyzes contents of the basic job (job scenario) instructed for execution, and then performs a sequence control of job steps with respect to the step executing sections 74-76 in accordance with this as described herebelow.

In other words, the image job executing section 73a instructs the step executing sections 74-76 to sequentially execute a plurality of job steps (for example, job steps of image input, image processing (omitted in some cases), and image output) constituting the basic job instructed by the basic job executing section 73 for execution.

(B14) In the sequence control, the image job executing section 73a firstly gives an instruction for execution of each job step and the job ID to the step executing section 74 in accordance with the execution order indicated by the instructed basic job and starts up the input step executing section 74.

(B15-17) In response to this, the input step executing section 74 reads the setting information from the job information having the received job ID, and allows the device operating section 61 and device controller 41 to read document image data for one page through the scanner 16S based on this. At this time, the device operating section 61 operates the device controller 41 in accordance with a notice regarding a state from the device controller 41.

(B18) When page information such as allocated address and range of document image data in the processing above is received from the device operating section 61, the input step executing section 74 writes the page information such as allocated address and range of the document image data to the job information associated with the facsimile transmission processing in the job information storage section 77, and thereafter gives a notice regarding the completion to the image job executing section 73a in the basic job executing section 73.

(B19) In response to this, the image job executing section 73a gives the job ID of the facsimile transmission job to the output step executing section 76 in accordance with the basic job, and starts up the output step executing section 76.

(B20, B21) In response to this, the output step executing section 76 reads the setting information including the page information from the job information having the job ID, and accommodates the document image data directly or as a file to the entity section 63 based on this, and gives a notification regarding the completion to the image job executing section 73a of the basic job executing section 73.

(B22) In response to this, the image job executing section 73a refers to the basic job (job scenario of ScanToBox) to determine whether or not execution of all of job steps is completed. In other words, if it is determined that execution of the ScanToBox basic job is completed, the image job executing section 73a gives a notice regarding the completion is given to the job control section 72.

(B23) In response to this, the job control section 72 gives a notice regarding completion of the basic job (ScanToBox) along with the job ID to the job management section 71.

(B24) In response to this, the job management section 71 allows the resource management section 43 to deallocate the hardware resource obtained at the time of starting the basic job. Further, the job management section 71 refers to job information indicated by the job ID and stored in the job information storage section 77, reads that the next basic job (BoxToFax) is available, and requests the resource management section 43 to obtain a hardware resource such as the facsimile modem 18 necessary for execution of the next basic job (BoxToFax).

(B25-B27) After obtaining the resource, the job management section 71 reads destination facsimile number from the job information, and allows the device controller 41 to directly execute a control of calling out a destination through the device operating section 61. At this time, the device operating section 61 operates the device controller 41 in accordance with a notice regarding a state from the device controller 41.

In view that the routine cannot proceed to the next processing If this control of calling out fails, this control is similar to allocation of resource, and making the job management section 71 be responsible for this organizes a program structure so that it contributes to easiness in changing a design.

The area of the DRAM 13D necessary for execution of the basic job of the BoxToFax is allocated in advance in the initializing processing at a time of starting up the image forming apparatus 10. Accordingly, it is not necessary to obtain the hardware resource at this point of time.

(B28-B30) When an on-hook of an addressee facsimile is detected, the device controller 41 gives a notice regarding this to the job management section 71 through the device operating section 61.

(B31) In response to this, the job management section 71 instructs the job control section 72 to perform next control of the job.

(B32) In response to this, the job control section 72 refers to the job information, and gives the basic job executing section 73 an identifier of BoxToFax as a basic job to be executed next, and instructs execution of the basic job (BoxToFax).

In response to this, the basic job executing section 73 transmits the job ID and the identifier of the basic job (BoxToFax) to the image job executing section 73a, and starts up the image job executing section 73a. In response to this, the image job executing section 73a analyzes contents of the basic job indicated by the received identifier, and sequentially controls job steps of image input, image processing (omitted in some cases), and image output with respect to the step executing sections 74-76 in accordance with this as follows. In other words, instruction of sequentially executing a plurality of job steps constituting the instructed basic job in accordance with the basic job scenario is given to the step executing sections 74-76.

(B33) In this sequence control, the image job executing section 73a firstly gives an execution instruction for each job step and the job ID to the input step executing section 74 and starts up the input step executing section 74 in accordance with the execution order indicated by the instructed basic job.

(B34, B35) In response to this, the input step executing section 74 reads the setting information (including the page information) written in the job information having the received job ID and corresponding to the kind of job (facsimile transmission job), and reads a file from the entity section 63 in accordance with this, and gives a notice regarding completion of the job step to the image job executing section 73a.

(B36) In response to this, the image job executing section 73a, in accordance with the basic job (Box To Fax), gives the job ID to the output step executing section 76 for execution of the next job step and starts up the same. In the present embodiment, since the image processing is omitted, the edit step executing section 75 is not called out. However, in a case of calling out, the edit step executing section 75 executes an image processing suitable for an ability of a facsimile machine on a called out side.

(B37-B41) In response to this, the output step executing section 76 reads the setting information from the job information indicated by the job ID, obtains image data or a file accommodated in the entity section 63 based on this, allows the device controller 41 through the device operating section 61 to send via facsimile the obtained image data or data in the file, and gives a notice regarding completion of the job step to the image job executing section 73*a*.

(B42) In response to this, the image job executing section 73*a* refers to contents of the basic job. If it can be determined that execution of all of job steps is completed, in other words, if it can be determined that execution of all of job steps constituting the basic job is completed, the image job executing section 73*a* gives a notice regarding completion of the basic job (Box To Fax) to the job control section 72.

(B43) In response to this, the job control section 72 gives a notice regarding completion of the basic job (Box To Fax) and the job ID to the job management section 71.

(B44-B46) In response to this, the job management section 71 allows the resource management section 43 to deallocate the hardware resource obtained for execution of the BoxTo-Fax basic job, refers to job information nextly, determines that execution of all of basic job constituting the facsimile transmission job is completed, deletes job information provided with the job ID from the job information storage section 77, and gives a notice regarding completion of the job along with the job ID to the system management section 52 and user service executing section 82.

According to the present embodiment, one or more basic job is executed in the applied job layer in accordance with a job scenario. Accordingly, jobs can be added or changed by combination of basic jobs without changing the basic job layer and subsequent ones, so that it can achieve an effect that changing in design of a job becomes easy.

Figure 8:
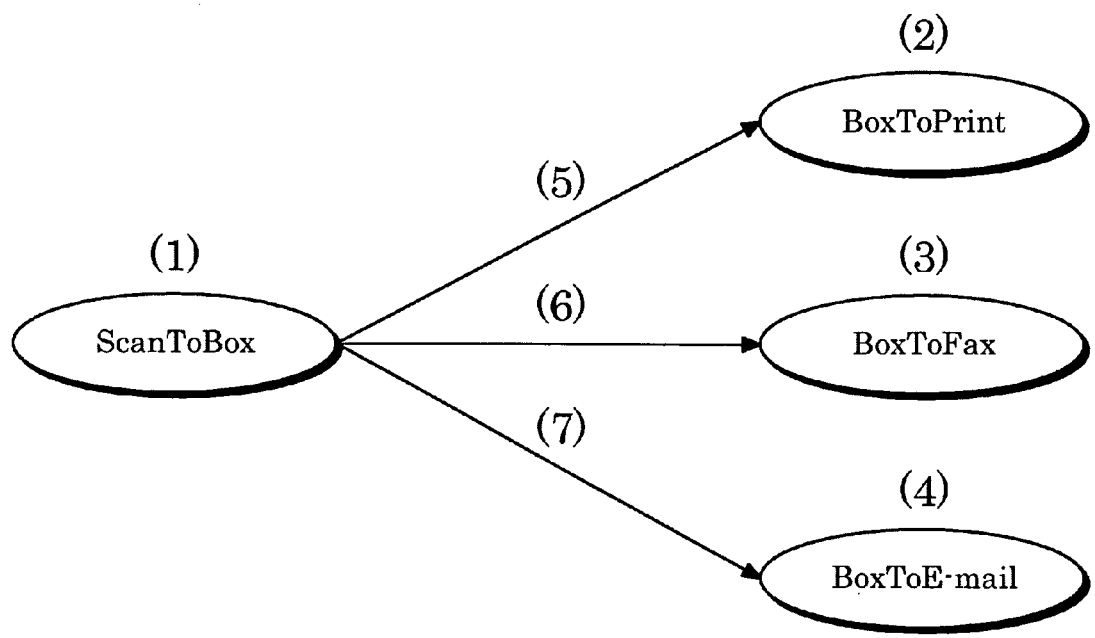
FIG. 8 shows basic jobs and a plurality of services achieved by combinations of the basic jobs.

Further, in the present embodiment, sequence from the image input to saving of file is defined as one basic job (ScanToBox). Accordingly, following the control described above, a plurality of jobs can be realized by combination of this (basic job (ScanToBox)) and other basic jobs. For example as shown in FIG. 8, by defining four basic jobs of (1) ScanToBox, (2) BoxToPrint, (3) BoxToFax, and (4) BoxToE-mail, not only the respective basic jobs but also three jobs according to combinations of those, in other words, each of (5) ScanToBox+BoxToPrint=ScanToPrint
(6) ScanToBox+BoxToFax=ScanToFax
(7) ScanToBox+BoxToE-mail=ScanToE-mail can be further defined. Further, if one of basic jobs is changed, contents of job including this can be changed. Accordingly, an effect of making it easy to change a design at a time of changing a job is enhanced. Further, an effect of simplifying configurations of application for executing each operation of the image forming apparatus 10 can be achieved.

Further, since the facsimile transmission job is a combination of the ScanToBox basic job and the BoxToFax basic job, for example, if a jam occurs in the ScanToBox basic job, execution of the BoxToFax basic job is not started unless the jam in the ScanToBox basic job is eliminated. Therefore, it can achieve an effect of avoiding occurrence of wasteful processing due to starting of execution of next BoxToFax basic job while execution of the processing stagnates due to occurrence of the jam in the ScanToBox basic job.

[12] Scanning Service Execution Flow

Figure 9:
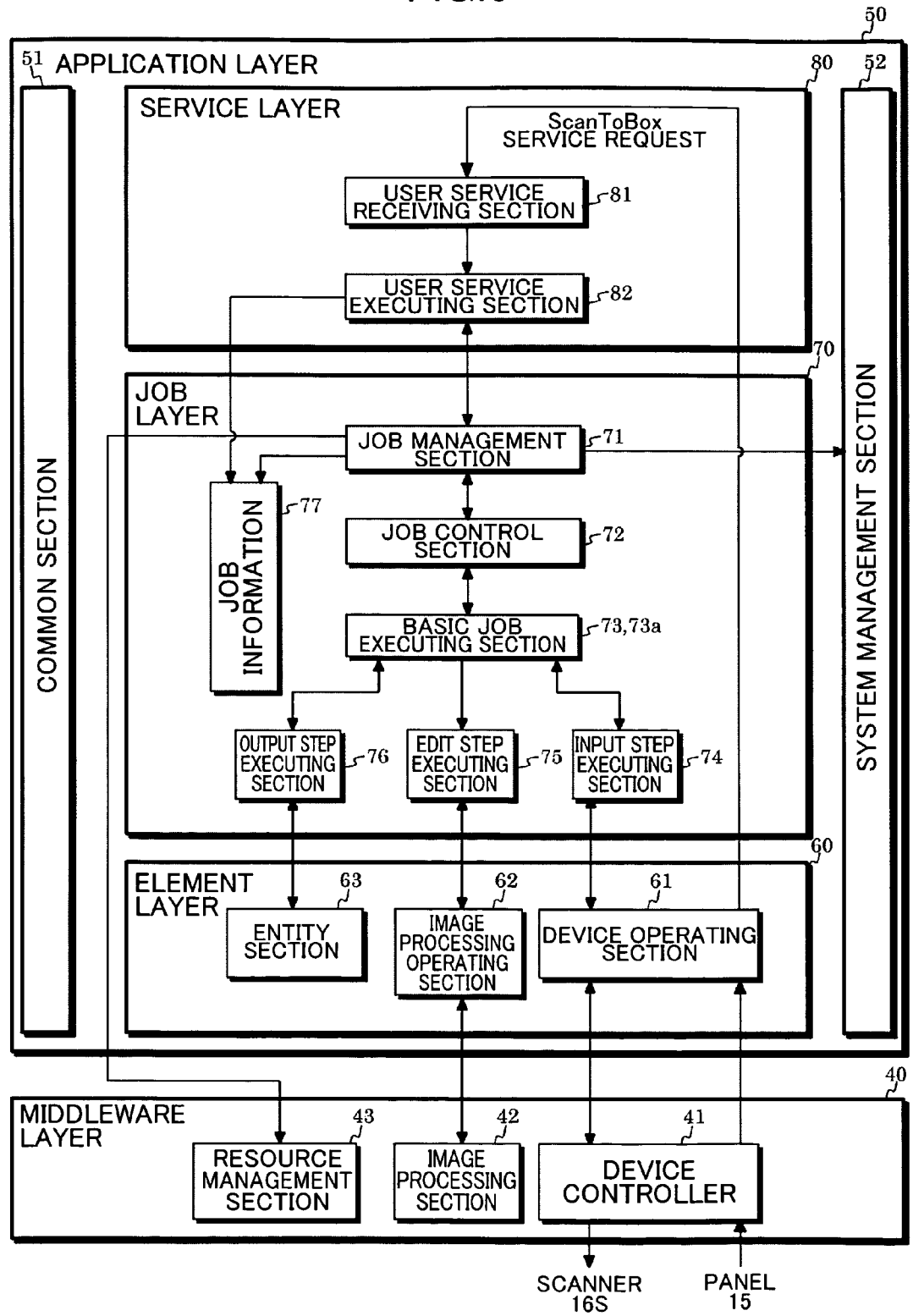
FIG. 9 shows a flow of executing a scanning service.

FIG. 9 shows a flow of executing the scanning service. This service is realized in a processing order similar to that of the ScanToBox basic job. However, in FIG. 9, an image editing processing is included between the scan input and the file output.

[13] In-Box File Printing Service Execution Flow

Figure 10:
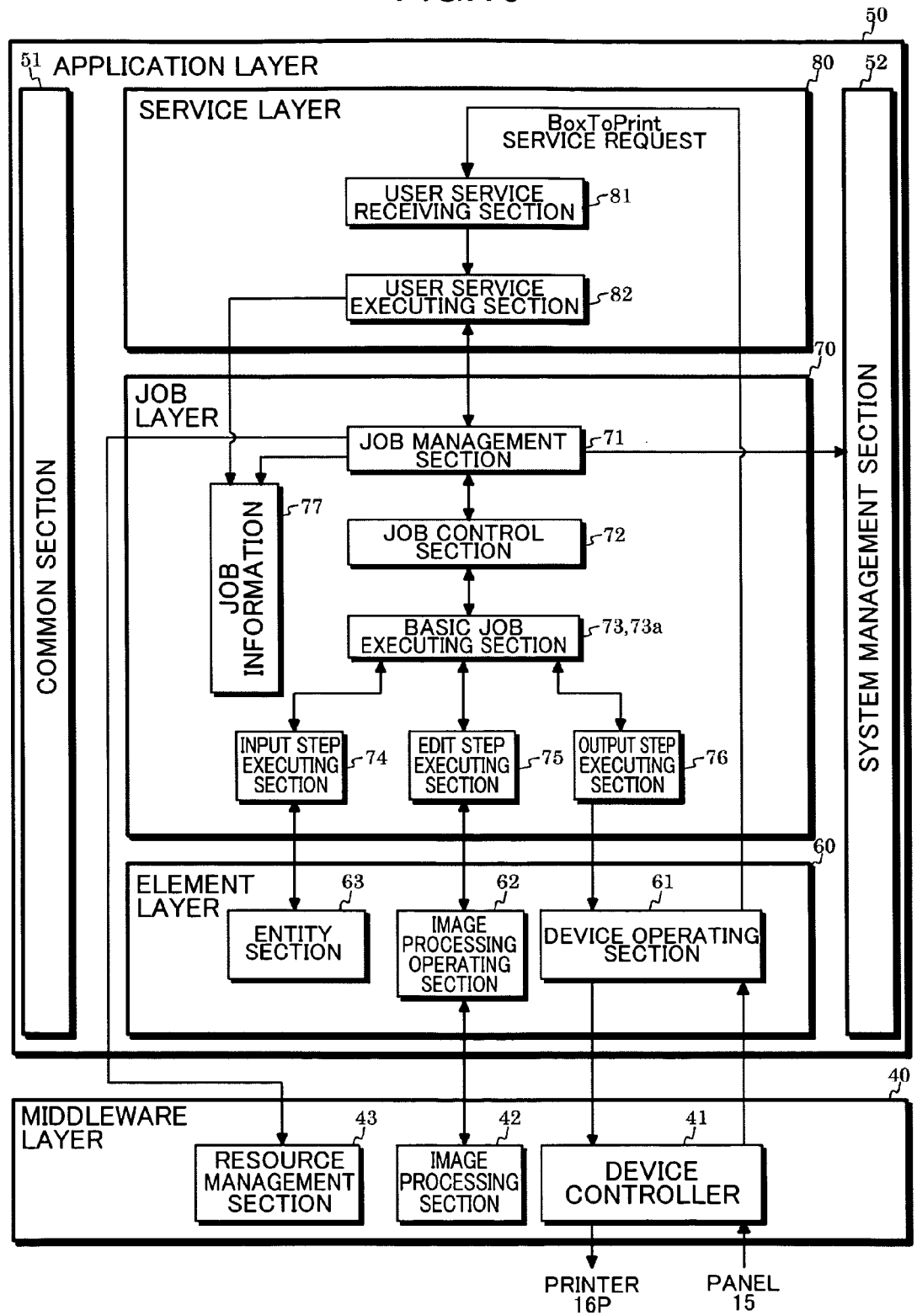
FIG. 10 shows a flow of executing in-box file printing service.

FIG. 10 shows a flow of executing the in-box file printing service, where functional sections are connected with lines having arrows. This service (basic job of BoxToPrint) can be executed similarly to the basic job of the BoxToFax in view of flow of the processing by replacing the processing related to the facsimile control in the basic job of the BoxToFax with the processing related to the print control. However, in the basic job of the BoxToPrint, an image editing processing necessary for the print processing is included between the file reading and the printing output.

[14] Flow for a Time when a Jam Occurs During Execution of the Scanning Service

Figure 11:
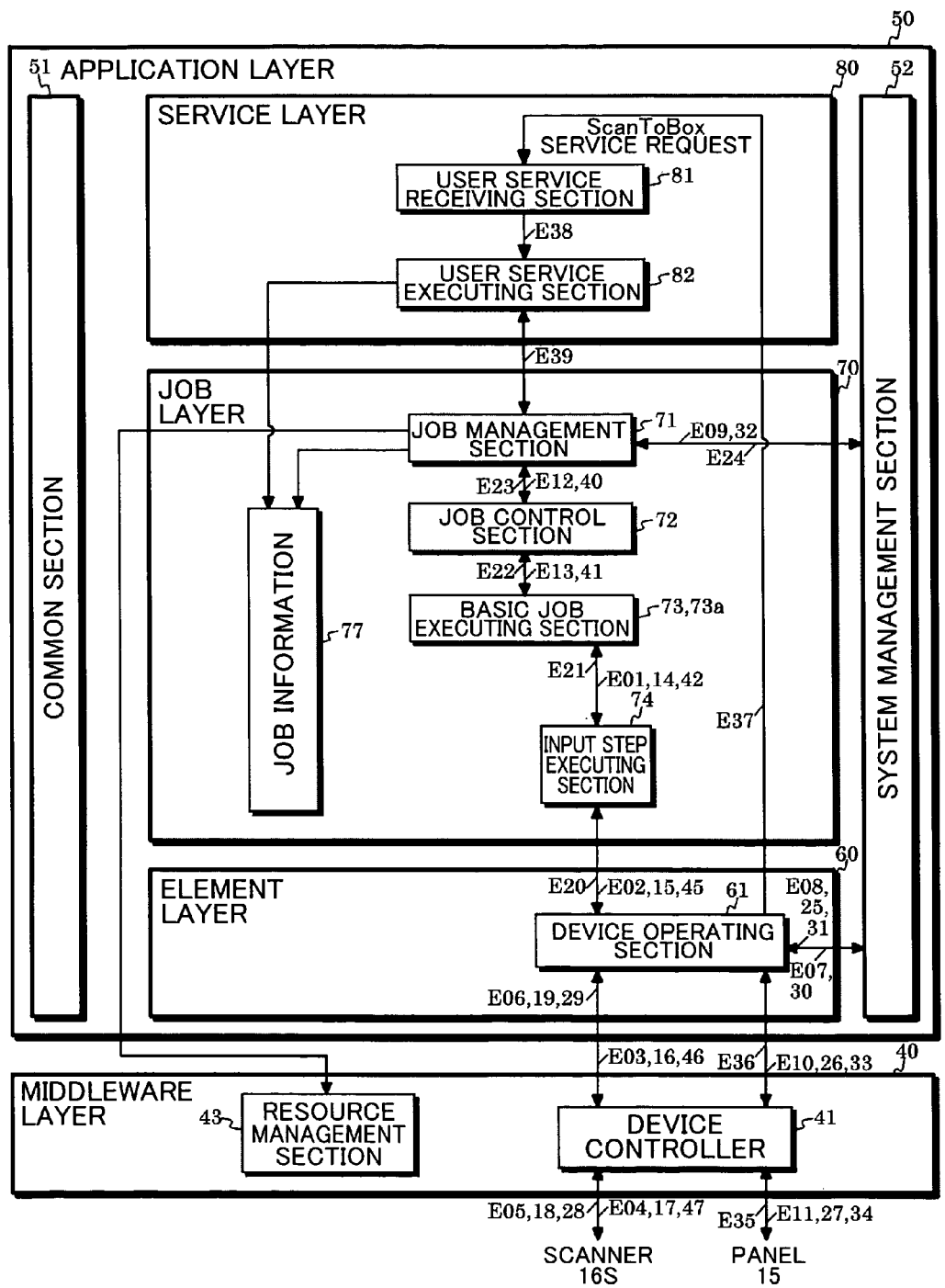
FIG. 11 shows a flow for a time when a jam occurs during executing the scanning service.

FIG. 11 shows a flow for a time when a jam occurs during the execution of scanning service. In FIG. 11, the lines with arrows connecting the functional sections show state of transmitting instructions between the functional sections.

The job of the scanning service is configured by one ScanToBox basic job. Herebelow, the processing executed by the image job executing section 73*a* in the basic job executing section 73 will be described.

(E01) The image job executing section 73*a*, firstly, in accordance with an execution order indicated by an instructed basic job (ScanToBox), gives an execution instruction for each job step and the job ID to the input step executing section 74 and starts up the input step executing section 74.

(E02-E04) In response to this, the input step executing section 74 reads the setting information from the job information having the received job ID, and starts to read document image data for one page from the scanner 16S through the device operating section 61, the device controller 41, and the like in accordance with this.

(E05, E06) At this time, if a jam occurs in an automatic sheet feeder of the scanner 16S, the device controller 41 gives a notice regarding occurrence of a jam to the device operating section 61.

Here, since the notice from the device controller 41 relates to occurrence of an error, the device operating section 61 gives a notice indicating the occurrence of error to the system management section 52 along with an identifier indicating an equipment subjected to occurrence of the error and the job ID indicating the job under execution. On the other hand, in a case where the notice from the device controller 41 does not relate to occurrence of error, the device operating section 61 is responsible for giving the notice along with the job ID to the input step executing section 74.

(E07) Thus, the device operating section 61 gives a notice related to occurrence of jam along with the identifier of the equipment and the job ID to an origin of starting up (in other words, it is the system management section 52 in this case).

(E08, E09) The system management section 52, when it receives the notice regarding occurrence of error, is responsible for giving the notice along with the equipment identifier to the operation panel program of the device operating section 61 and giving a notice along with a job ID to the job management section 71.

(E10, E11) In response to this, the device operating section 61 allows the operation panel 15 through the device controller 41 and device driver 31 to display occurrence of error (occurrence of jam) in an equipment associated with the equipment identifier.

(E12) On the other hand, the job management section 71, in response to the notice, gives a notice related to the jam error to the job control section 72. The job control section 72 determines whether or not the error falls in a predetermined reason for aborting.

(E13) Here, it is defined that a jam error falls in a reason for aborting. Therefore, the job control section 72 instructs the image job executing section 73*a* of the basic job executing section 73 to abort the job.

(E14-E17) In response to this, the image job executing section 73*a* allows the device controller 41 to abort operation of the scanner 16S through the input step executing section 74 and the device operating section 61 under execution.

(E18, E19) If the operation of the scanner 16S is aborted, the device controller 41 gives a notice of stopping operation of the scanner 16S to the device operating section 61.

(E20) The device operating section 61 gives a notice of stopping to the input step executing section 74.

(E21-E23) The input step executing section 74 gives a notice of stopping to the job management section 71 through the image job executing section 73a and the job control section 72.

(E24) Since this notice is a state change of the job, the job management section 71 gives a notice regarding this to the system management section 52.

(E25-E27) Since this notice is a job state change, the system management section 52 gives a notice regarding this stopping through the device operating section 61 and the device controller 41, so as to display stopping of operation on the operation panel 15. A user looks at the display of aborting scanning due to occurrence of jam error, and releases the jam.

(E28, E29) When the release of jam by the user is detected by the scanner 16S, this is notified to the device operating section 61 through the device controller 41.

(E30) The device operating section 61 notifies the release of jam error to the system management section 52.

(E31, E32) The system management section 52 notifies this release to the operation panel program of the device operating section 61 along with the equipment identifier, and on the other hand to the job management section 71 along with the job ID so as to be capable of receiving a job restart.

(E33, E34) The device operating section 61, in response to this release notice, erases the display of jam error from the operation panel 15 through the device controller 41 and the device driver 31.

(E35-E37) If a user presses a start key on the operation panel 15 to restart the job, a job restart instruction inputted by the user is supplied along with the job ID to the user service receiving section 81 through the device driver 31, the device controller 41, and the device operating section 61.

(E38-E47) In response to this, the user service receiving section 81 allows the job control section 72 to restart the ScanToBox basic job through the user service executing section 82 and the job management section 71. The job control section 72 instructs the image job executing section 73a of the basic job executing section 73 to restart the basic job. In response to this, the image job executing section 73a allows the stopped job step executing section, in this case, the input step executing section 74, to restart the processing. In response to this, the input step executing section 74 allows the device controller 41 to operate through the device operating section 61. Accordingly, the document image reading operation executed by the scanner 16S is restarted.

According to the present embodiment, in the case of occurrence of error or release of error, this is notified from the device operating section 61 to the job management section 71 through the system management section 52, and stopping of operation or instructing of restart is sequentially performed from the job management section 71 toward the lower layer. Accordingly, a direction of instruction between modules goes from an upper layer to a lower layer regardless of presence or absence of error, so that a configuration of a program of the job layer 70 becomes simple, and it becomes easy to change a design of program.

[15] Notification Service Execution Flow

Figure 12:
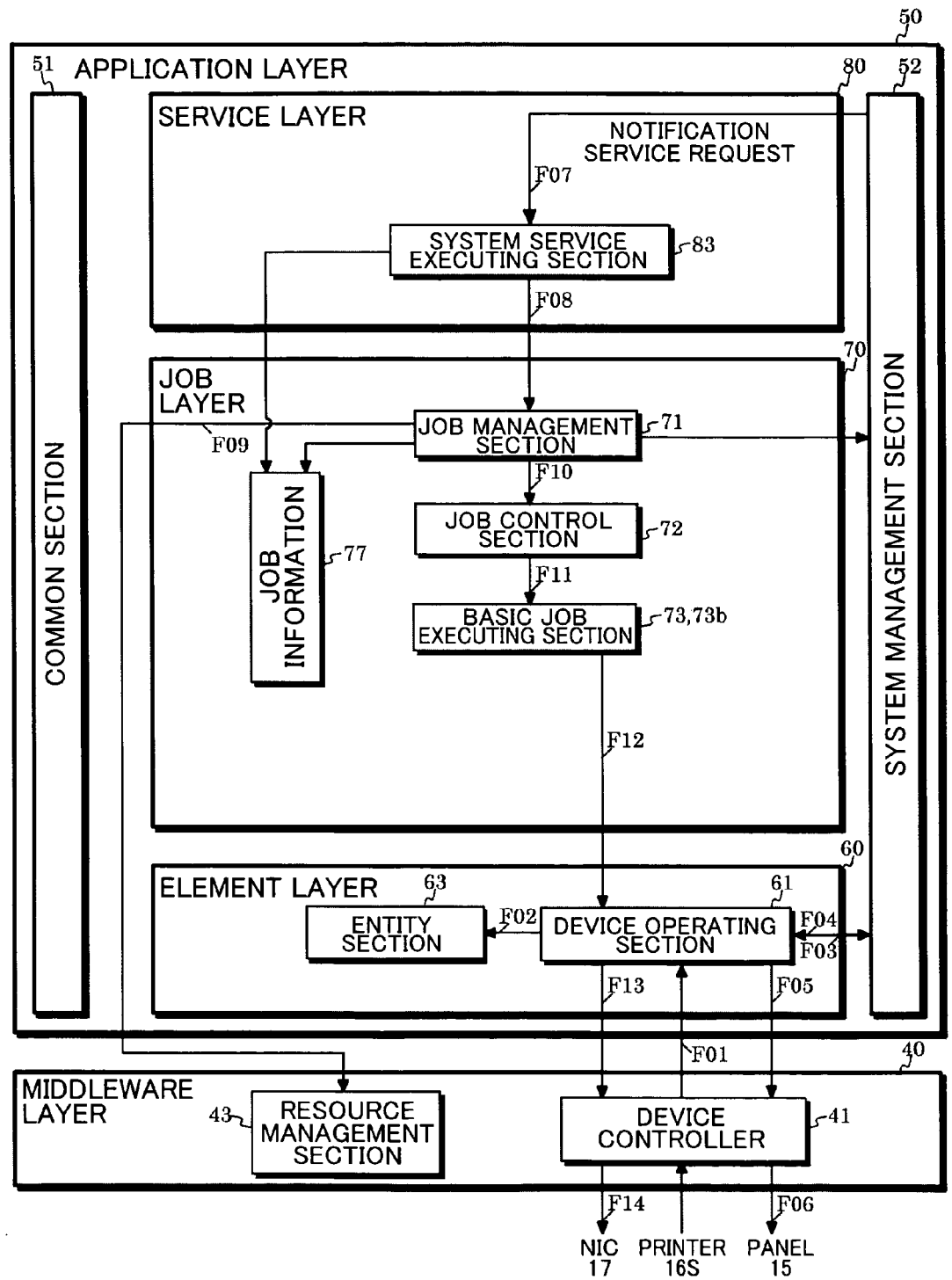
FIG. 12 shows a flow of executing an error notification service.

FIG. 12 shows a flow of a failure notification service which is executed when a failure occurs, for example, when a sheet cannot be fed from a sheet-feeding cassette 1 of the printer 16P during execution of printing, and a system actively requests the notification service.

Hereinafter, the operation executed by the device controller 41 during execution of printing will be described.

(F01-F03) If this failure (failure of the sheet-feeding cassette 1 of the printer 16P) is detected, the device controller 41 notifies this to the device operating section 61. The device operating section 61 writes an identifier (error identifier) indicating contents of the error to the entity section 63, and notifies occurrence of the error event to the system management section 52.

(F04-F06) If the notification related to occurrence of error event is received, the system management section 52 analyzes the error event in response to this. In a case where it is determined that the sheet feeding cassette 1 is made invalid, in other words, determined that the sheet feeding cassette 1 is separated, the system management section 52 allows the operation panel 15 to display this through the device operating section 61 and the device controller 41.

(F07) Here, the entity section 63 stores necessity of notification to a user, event which should be notified (changes in equipment and job state), notifying means such as printing and electronic mail, and destination of notification for the case of electronic mail, as executable notification processing in plural pairs. The system management section 52 refers to the entity section 63. If it is determined that it is necessary to notify error to a user, the system management section 52 requests the system service executing section 83 to give notification along with an identifier indicating the notification to be executed. Here, the system management section 52 refers to the entity section 63 and determines that it is necessary to notify an error to a user.

(F08) When the notification is received, the system service executing section 83 gives the identifier of the notification to the job management section 71, sends an instruction for generating a notification job, and executes the notification service.

(F09, F10) In response to this, the job management section 71 generates a notification job similarly to the job-generating executed by the user service receiving section 81 and the user service executing section 82 and using the job scenario (basic job), allows the resource management section 43 to obtain a hardware resource such as memory necessary for executing the notification and the NIC 17, and gives the job ID of the notification to the job control section 72 after obtaining, and then gives an instruction of a job control. Here, a job scenario (basic job) necessary for constructing the notification job is prepared in, for example, the job information storage section 77.

(F11) In response to this, the job control section 72 reads the identifier of the job scenario (basic job) written in the job information having the received job ID from the job information storage section 77, and gives the identifier to the basic job executing section 73, and instructs execution of the job scenario (basic job) indicated by the identifier.

In response to this, the basic job executing section 73 transmits the identifier indicating the job scenario (basic job) received from the job control section 72 to the access job executing section 73b to instruct execution of the job scenario (basic job) indicated by the identifier, and starts up the access job executing section 73b.

(F12-F14) The access job executing section 73b, in accordance with the job scenario (basic job), transmits an electronic mail notifying separation of the cassette 1 to the device operating section 61, the device controller 41, the device driver 31, and the NIC 17.

Conventionally, such notification has been integral with a print job. However, in the present embodiment, the notification is defined as notification job independent from a normal job, and a notification is executed in response to the notification service similarly to the normal job. Accordingly, a configuration of a program for executing a normal program is simplified, and a new or existing job can be easily defined by combining a basic job constituting the notification with other basic job, so that changing a design of application becomes easy.

[16] Address Book Edition Flow

Figure 13:
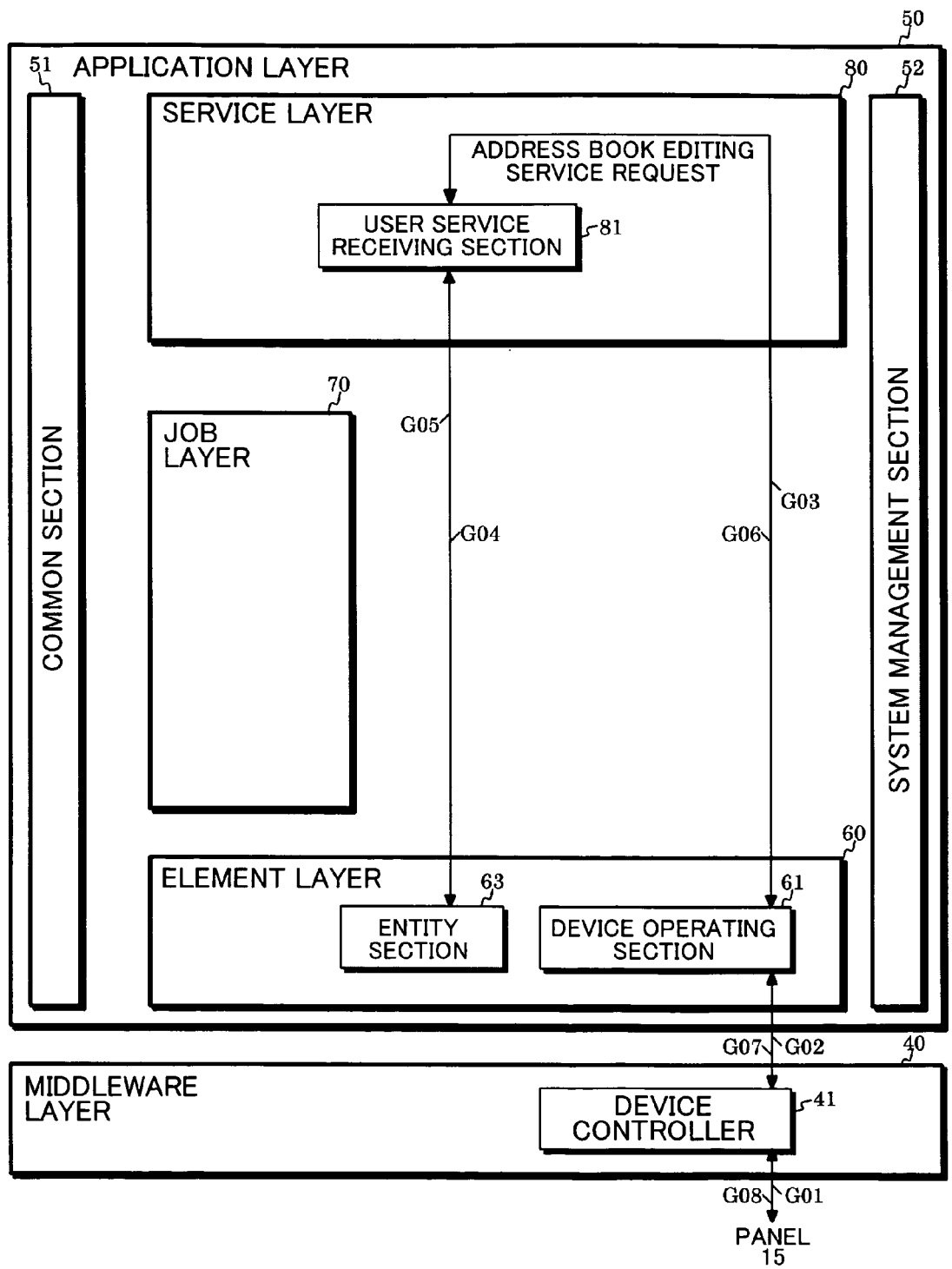
FIG. 13 shows a flow for a time when an address book is edited.

FIG. 13 shows a flow of editing an address book through the operation panel 15. If the application layer 50 is multi-layered for the purpose of making it easy to change a design of application, relations between layers and functional sections increase so that the configuration becomes complex. To avoid this and simplify a configuration, the following processing is executed in the address book edition flow. It should be understood that the processing similar to those in the flows described above will be omitted from description.

(G01-G03) If a user operates the operation panel 15 to input an edit service request instruction of an address book, the instruction is transmitted to the user service receiving section 81 through the device driver 31, the device controller 41, and the device operating section 61.

(G04) Since the instruction is an address book edit service request, the user service receiving section 81 directly allows the address book edition program in the entity section 63 to start up as a work without the user service executing section 82 and the job layer 70.

(G05-G08) Accordingly, the entity section 63 allows the user service receiving section 81 to supply the identifier indicating display data of operation screen for address book edition to the device operating section 61. Based on this identifier, the device controller 41 and the device driver 31 allows the operation panel 15 to display data of the operation screen. After that, editing of the address book is performed by a user interactively.

In the present embodiment, regarding an access to the entity section 63, the user service receiving section 81 receives a service request to integrate processing for receiving a service request. On the other hand, it is so configured that the entity section 63 is directly accessed from the user service receiving section 81 without using the job layer 70. Accordingly, complication of the application layer 50 is avoided, and especially it can achieve an effect of simplifying configurations of the job layer 70 and the user service executing section 82. According to this simplification, an effect of making it easy to change a design of the application layer 50 can be achieved.

[17] Log-in Execution Flow

Whether or not making the log-in processing (processing of determining whether or not authorizing a log-in of a user) be effective can be set by a user, and data for that is accommodated in the entity section 63. In the description herebelow, a case where the processing is effective will be described.

Figure 14:
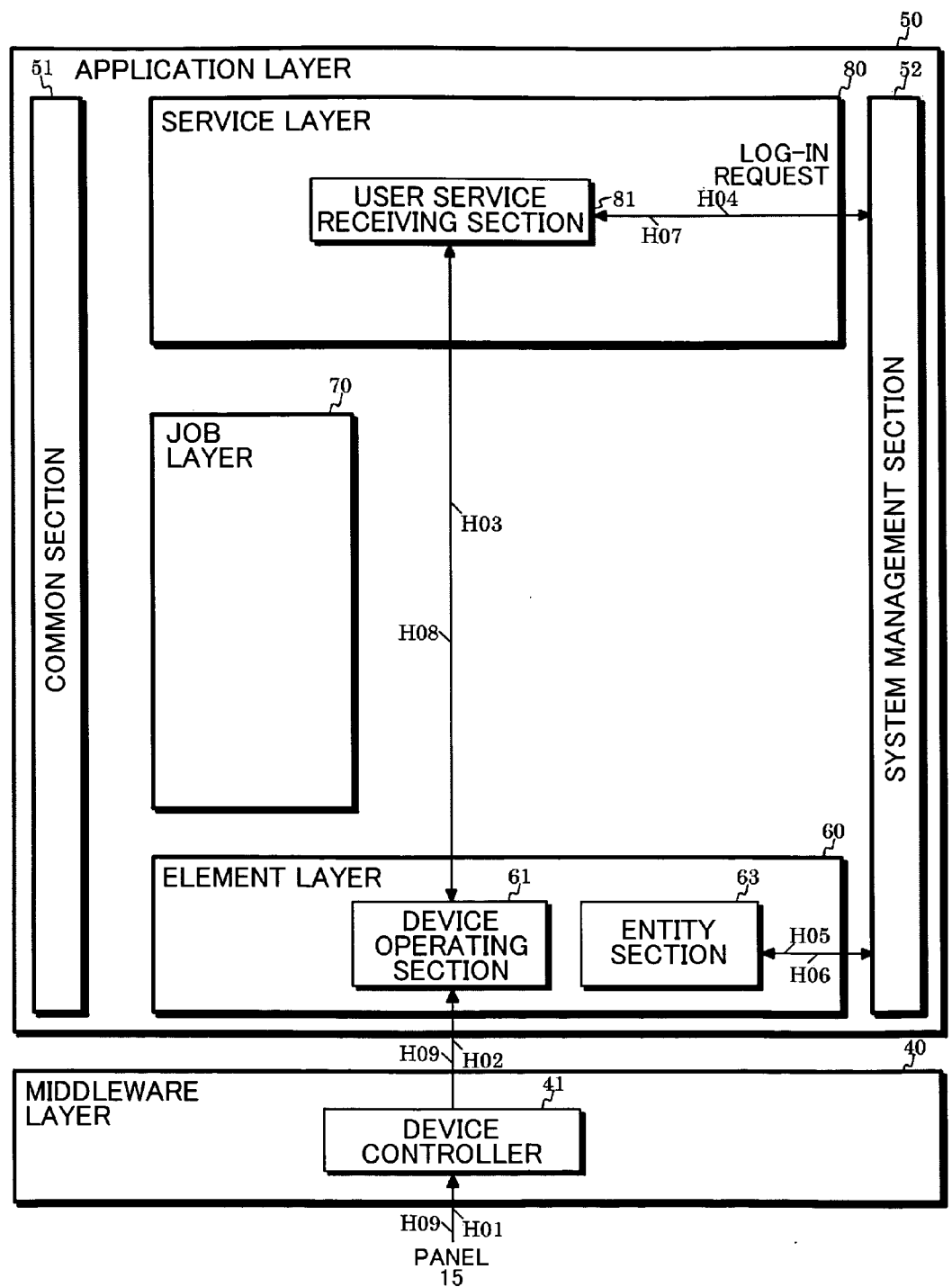
FIG. 14 shows a flow for a time when a log-in processing is executed.

FIG. 14 shows a flow of executing a log-in.

(H01-H03) When an execution request for a log-in processing from a user along with input of a password is transmitted from the operation panel 15 to the user service receiving section 81 through the device driver 31, the device controller 41, and the device operating section 61, the user service receiving section 81 interprets the service request.

(H04) When the user service receiving section 81 interprets that the service request is a log-in request, it directly allows the log-in program in the system management section 52 to start up as a work without the job layer 70.

(H05-H10) In response to this, the system management section 52 determines whether or not the password inputted through the operation panel 15 matches with the password registered in the entity section 63. The system management section 52 allows the result to be displayed on the operation panel 15 through the user service receiving section 81, the device operating section 61, the device controller 41, and the device driver 31.

[18] Authorization Execution Flow

Figure 15:
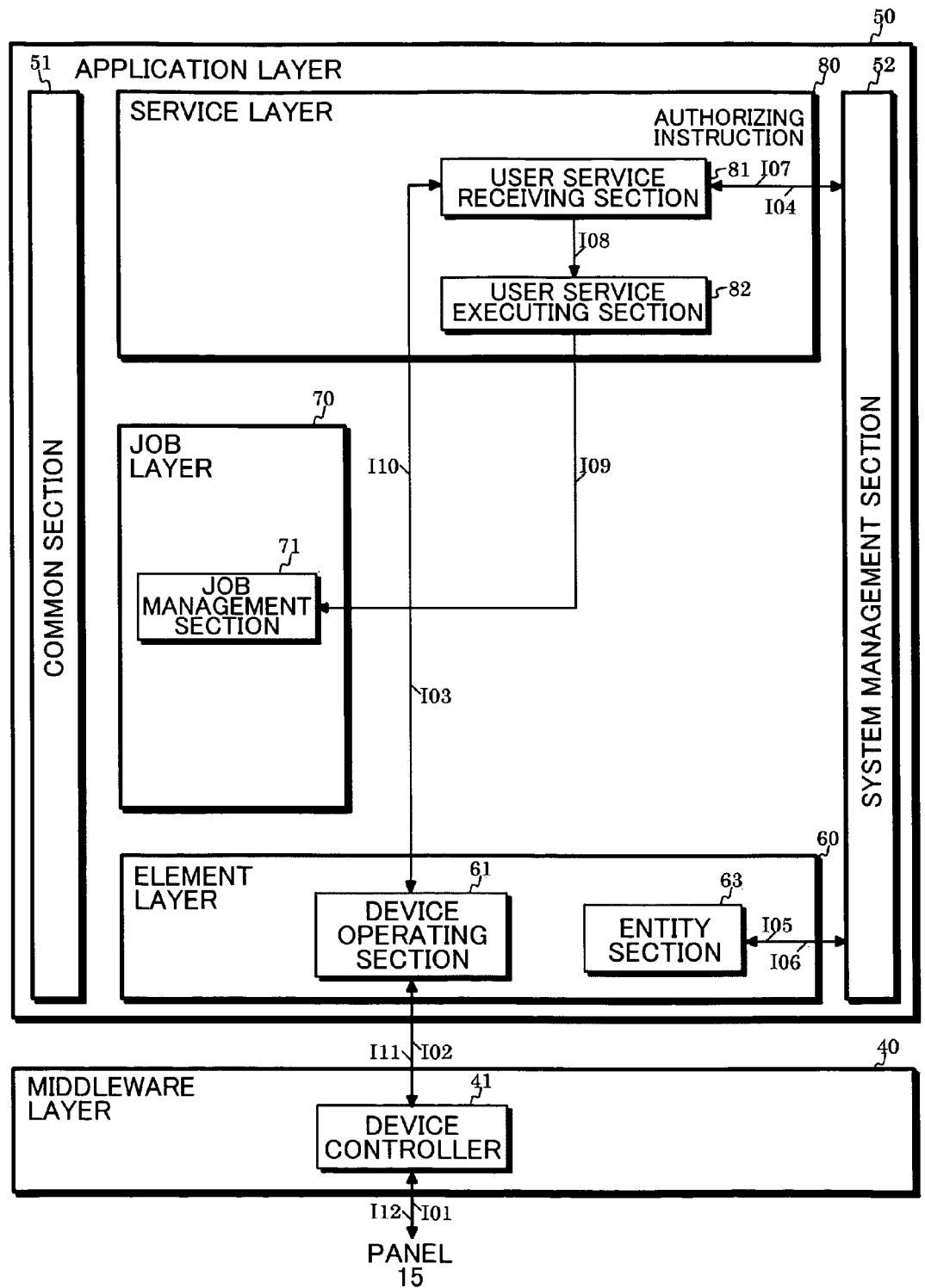
FIG. 15 shows a flow for executing a normal service in a case where an approval is set effectively and during the log-in processing.

FIG. 15 shows a flow of executing a normal service in a case where authorization is effectively set during a log-in state. The processing which is similar to the processing executed in the flow described above will be omitted from description.

(I01-I03) When an execution request of the authorization processing from a user is transmitted from the operation panel 15 to the user service receiving section 81 through the device driver 31, the device controller 41, and the device operating section 61, the user service receiving section 81 interprets the service request.

(I04) When the user service receiving section 81 determines that the service request is a service request of the authorization processing, it instructs the authorization processing as a work to the system management section 52 before instructing the user service executing section 82 to execute the service.

(I05-I07) In response to this, the system management section 52 refers to data of the entity section 63 to determine whether a logged-in user can enjoy the service and notifies a result to the user service receiving section 81.

(I08~I11) In a case where this is a notification of a positive determination, the user service receiving section 81 gives the user service executing section 82 an identifier of a job scenario of the service requested by a user for execution and the above-described setting information necessary for executing the service, and instructs the user service executing section 82 to execute the service. When this is a notification of a negative determination, it does not receive the service request and allows the operation panel 15 to display that matter through the device operating section 61, the device controller 41, and the device driver 31.

Conventionally, the authorization processing is not defined as one of services, and the authorization process has been executed in an upper layer of the service layer 80. However, in present embodiment, the authorization processing is also handled as one of services. Accordingly, the processing can be integrated, and the system management section 52 can be started up from the user service receiving section 81 without the user service executing section 82 and the job layer 70, so that it can achieve an effect that especially configurations of the user service executing section 82 and the job layer 70 can be avoided from being complex, and changing of design can be easily made.

Figure 16:
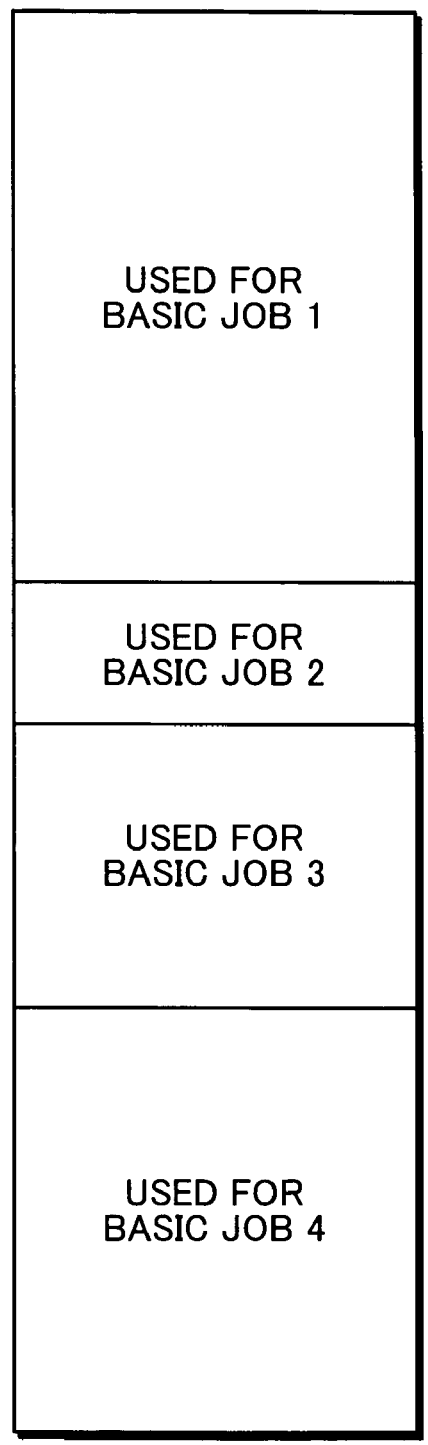
FIG. 16 shows a memory map of a DRAM in a case where plural kinds of basic jobs requiring data areas are executed in a parallel processing.

Next, data area allocation processing in the DRAM 13D will be described. FIG. 16 shows a memory map in the DRAM 13D in a case where a plural kinds of basic jobs requiring data area are executed in a parallel processing.

In a complex machine such as the image forming apparatus 10, plural kinds of jobs sharingly use one memory as data area. Therefore, as shown in FIG. 16, a case may arise in which an area necessary for executing new job is not available. To execute a new job which requires data area in such case, it is necessary to wait until enough empty area is secured in the memory.

Figure 17:
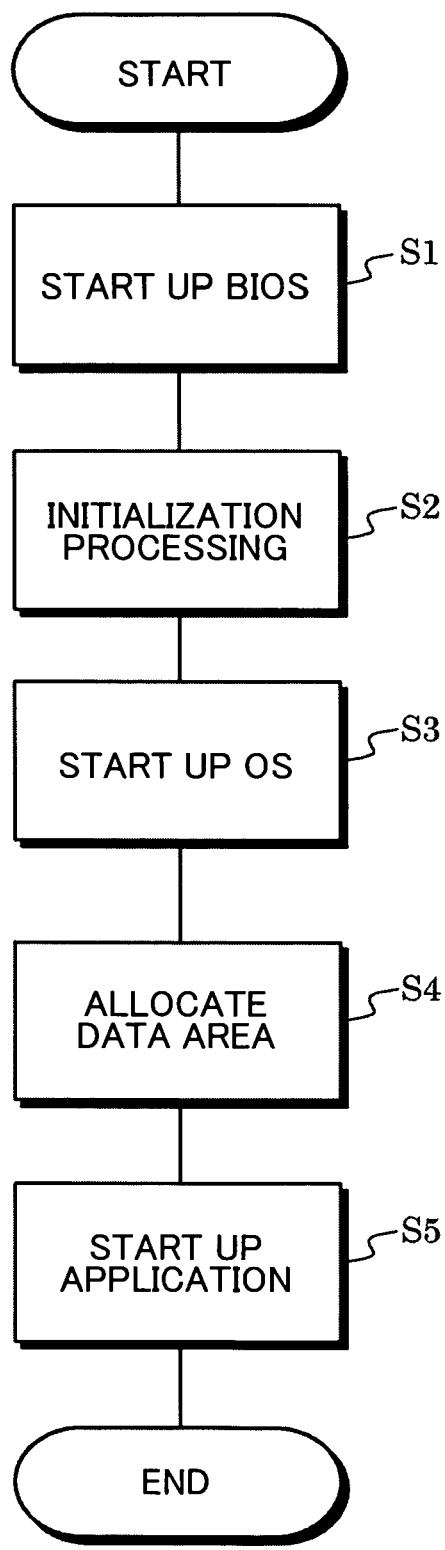
Figure 18:
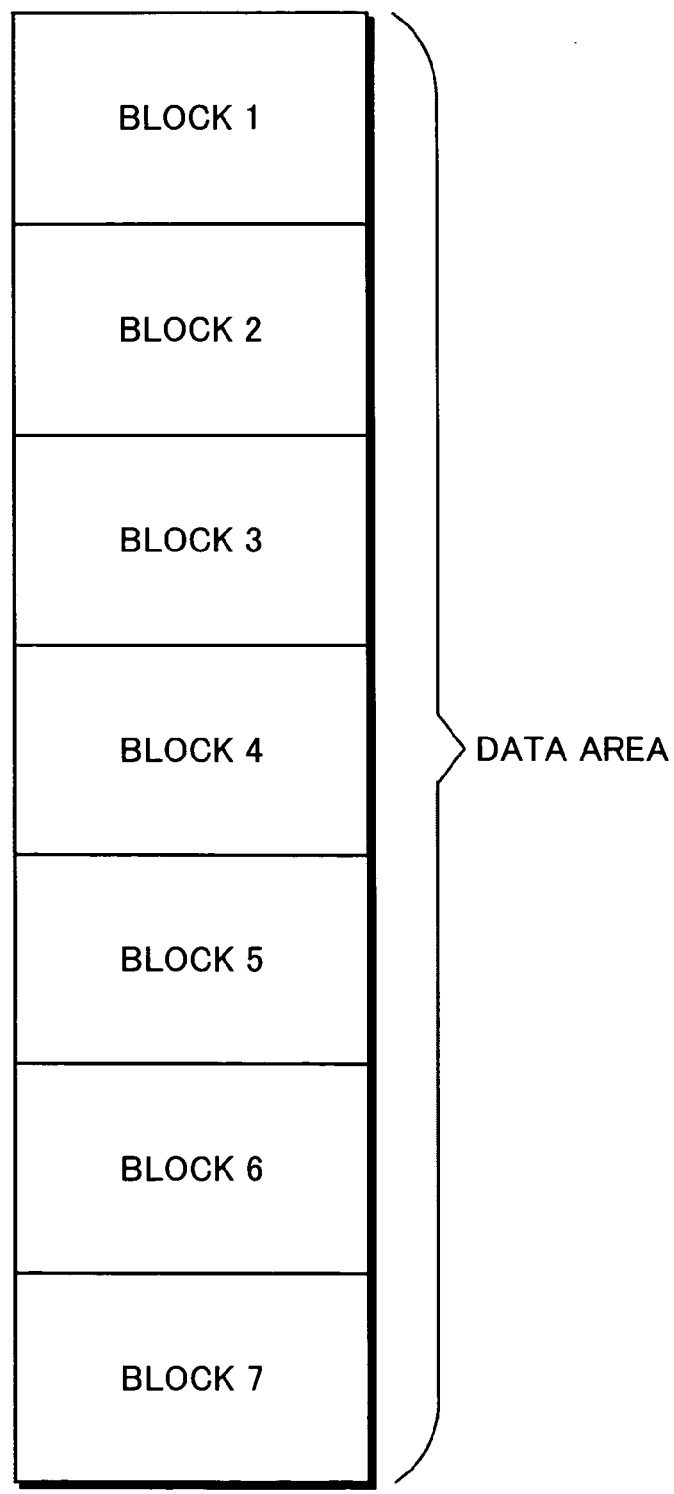
FIG. 18 shows a memory map in a DRAM after data areas are allocated.

Therefore, a method for enabling immediate use of data area will be described. FIG. 17 is a flowchart showing a processing at a time when a power source is turned on. Hereinafter, numerals surrounded by parenthesis are reference numerals indicating steps in the flowchart. FIG. 18 shows a memory map of the DRAM 13D after data area is allocated.

(S1) When the power source turns on, a BIOS accommodated in the EEPROM 13E1 is started up.

(S2) The BIOS executes an initializing processing of a hardware of the image forming apparatus 10, an initializing processing of a software, and the like.

(S3) Next, the BIOS starts up an OS 32 accommodated in the EEPROM 13E2.

(S4) The OS 32 divides the empty area of the DRAM 13D into units of blocks as shown in FIG. 18, and allocates the empty area as data area. This one block is an area capable of accommodating image data for one page. In FIG. 18, area in the DRAM 13D used by the OS 32 is omitted.

(S5) After the allocation, the OS 32 starts up the above-described operation control program in accordance with the present embodiment. In the present embodiment, the OS 32 and the application are started up on the EEPROM 13E2. However, these may be loaded to the SDRAM or the like and started up therefrom.

After that, when the user service executing section 82 gives an instruction to start executing the job, the resource management section 43 executes the following processing in Step A10 shown in, for example, FIG. 5.

Figure 19:
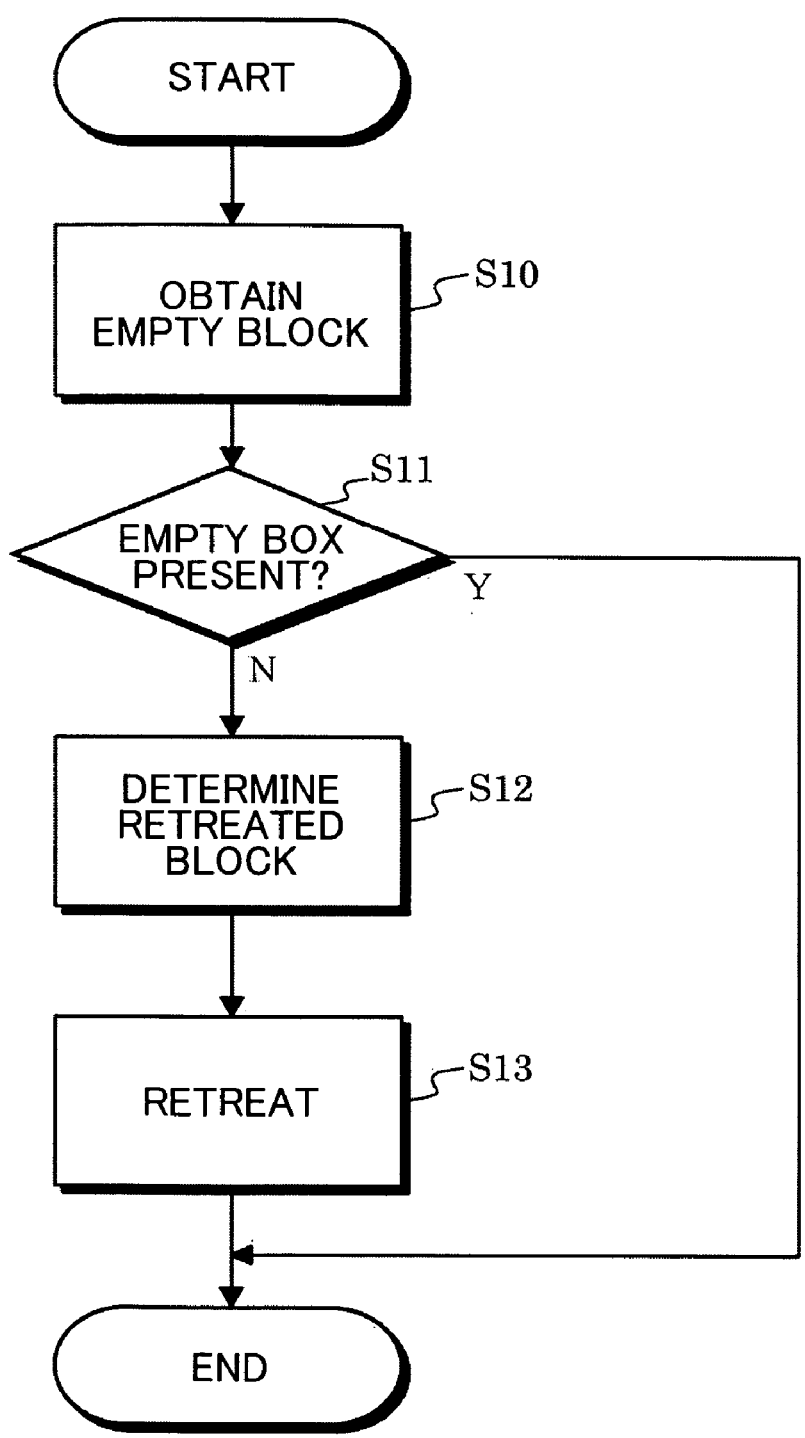
FIG. 19 is a flowchart showing a processing executed by a resource management section.
Figure 20:
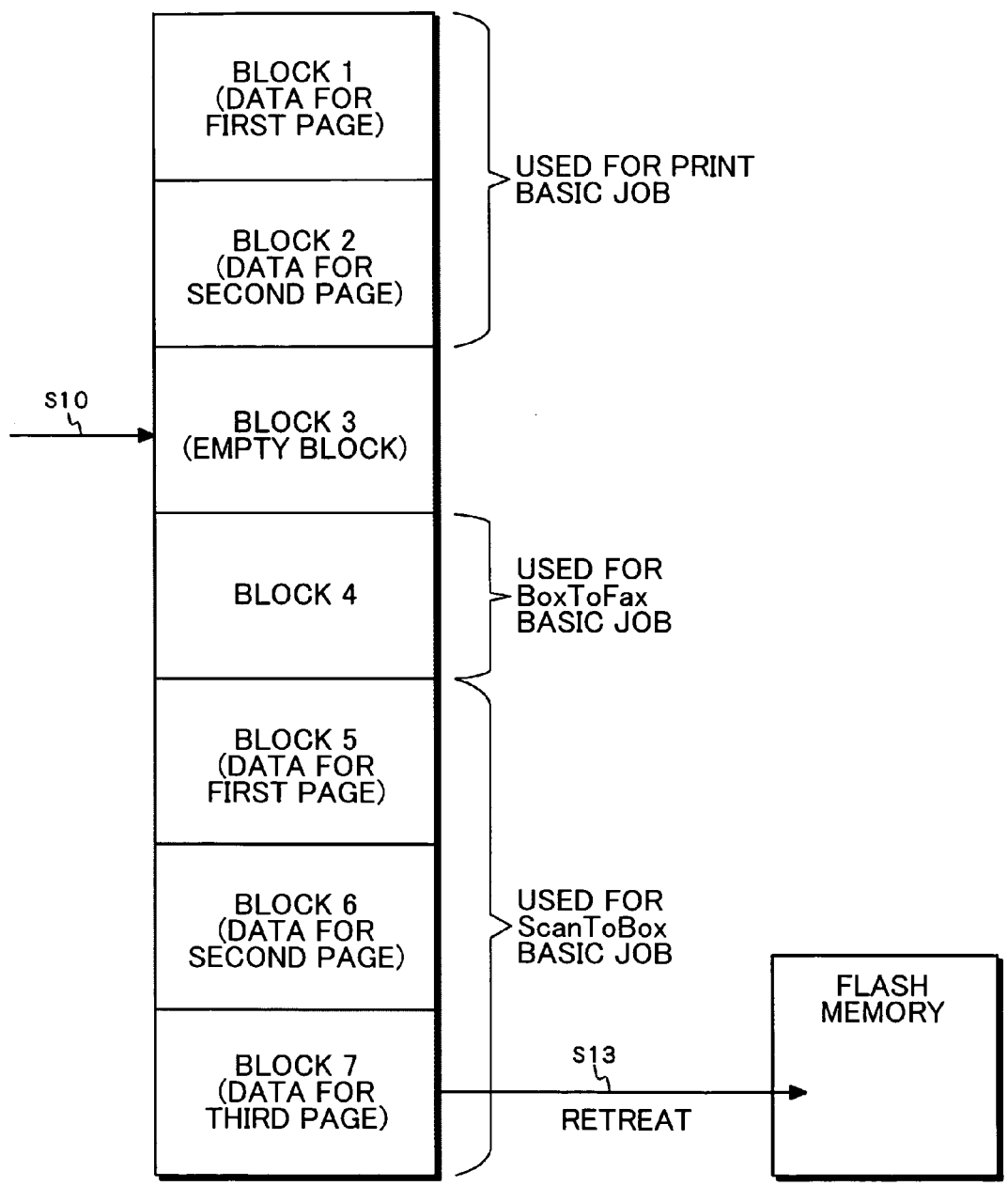
FIG. 20 further illustrates the processing shown in FIG. 19.

FIG. 19 is a flowchart showing a processing of the resource management section 43 in accordance with the embodiment of the present invention. FIG. 20 shows a part of the flowchart. The numerals surrounded by parenthesis indicate reference signs indicating steps shown in FIG. 19.

(S10) The resource management section (resource allocating section) 43 obtains one of empty blocks allocated as data area in the DRAM 13D shown in FIG. 18 for execution of the basic job (refer to FIG. 20).

(S11) The resource management section 43 determines whether or not there is an empty block in the DRAM 13D. The resource management section 43 terminates the processing if a positive determination is made, or it proceeds to next step S12 if a negative determination is made. The print basic job and the ScanToBox basic job shown in FIG. 20 use one block for data of one page.

(S12) The resource management section 43 determines a retreated block in accordance with a rule. The resource management section 43 finds a basic job which uses, for example, the largest number of blocks, and specifies a block in which a processing is executed at the latest among the plurality of blocks as a retreated block in accordance the rule for specifying the retreated block. Further, in a case where there are plurality of basic jobs using the same number of blocks, the resource management section 43 specifies one basic job in accordance with a pre-set priority order, and determines a block in which a processing is executed at the latest among those as a retreated block. Further, instead of specifying a block in which a processing is executed at the latest among the basic jobs using the largest number of blocks as a retreated block, the resource management section 43 may specify a retreated block in accordance with a rule according to which a block in which a processing is executed at the latest in a waiting basic jobs among a plurality of basic jobs as a retreated block.

(S13) The resource management section 43 allows data in the retreated block determined as described above to retreat temporarily to an auxiliary storage device, for example, an external flash memory (not shown in FIG. 1) as shown in FIG. 20. For example, when two or more empty blocks are allocated in the DRAM 13D, the resource management section 43 puts data in the retreated block back to the empty block.

By configuring as described above, when the resource management section 43 allocates data area next time, there always exists an empty block in the DRAM 13D. Accordingly, an effect of preventing a memory resource from being lacked at a time of execution of a job, and using the empty block as data area immediately can be achieved.

Further, if the resource management section 43 executes the processing so that data area is allocated in advance in the DRAM 13D at a time of starting up the power source, it can achieve an effect that data area is to be used by the resource management section 43 can be always allocated even if an area of a part in the DRAM 13D is used at by the OS 32 or application for other purpose at a time of starting up the power source.

The present invention includes other various modifications.

For example, in FIG. 3, the job information storage section 77 is included in the job layer 70 to store job information for each job. However, the job information storage section 77 may be arranged outside of the job layer 70, and may be included in, for example, the entity section 63, the common section 51, or the like.

Further where to place a border between the device operating section 61 and the device controller 41 in FIG. 3 is optional. It is enough as long as the device operating section 61 uses the device controller 41 to control a device without depending on a kind of machine.

Further, a plurality of functional sections shown in FIG. 3 may be configured as one as a whole. For example, it may be so configured that (1) the user service receiving section 81 and the user service executing section 82 as one user service providing section, (2) the job control section 72, the image job executing section 73a, and the access job executing section 73b as one job executing section, (3) the input step executing section 74, the edit step executing section 75, and the output step executing section 76 as one step executing section.

Furthermore, arrangement of the functional sections shown in FIG. 3 in the layers 60-80 can be changed appropriately. For example, the job control section 72 which instructs sequential execution of job scenario constituting a job may be arranged in the user service executing section 82 of the service layer 80 above the job layer 70 or may be arranged under the same. In this case, the job management section 71 receives instruction of executing a basic job through the job control section 72, allows the resource management section 43 to allocate a hardware resource necessary for the basic job, and thereafter transmits the execution instruction to the basic job executing section 73. According to this configuration, arrangement of the functional sections shown in FIG. 3 may have options.

Further, the system management section 52 shown in FIG. 3 collectively performs both management of a state of system and user management by the authentication processing, but it may have a configuration of managing any one of the above, and a functional section other than the system management section 52 may manage the other one. Further, it may be so configured that, among the user management which the system management section 52 is responsible, another functional sections may be responsible for the log-in processing shown in FIG. 14 or the authentication processing shown in FIG. 15.

Furthermore, a part of or all of the functional sections 41-43 of the middleware layer 40 shown in FIG. 3 may be provided in the application layer 50, and the functional sections 41-43 of the middleware layer 40 may function as a part of the operation control program in accordance with the embodiment of the present invention.

The basic job (job scenario) may include a plurality of job steps and information regarding its execution order, for example, it may be pairs of arguments (inputKind, editKind, outputKind) of functions fnc (inputKind, editKind, output-Kind). The inputKind, editKind, and outputKind correspond respectively to kinds of image input means, image processing, and image output means, and are processed in the order of the function fnc, and the order of arguments indicates the job step execution order.

Similarly, it is sufficient that the job may include at least one job scenario (basic job) and information of its execution order. For example, it may be a pair of argument (jobKind1, jobKind2) of function fnc (jobKind1, jobKind2). The job-Kind1 and jobKind2 indicate first and second job scenario (basic job) respectively, and the order of arguments indicate the job execution order.

Further, in the embodiment, it is described that construction of the job is mainly performed by the user service receiving section 81 and the user service executing section 82 in accordance with decision of selection of job scenario (basic job) and execution order. However, it may be so configured that the job control section 72 constructs the job in accordance with decision of selection of job scenario (basic job) and execution order, gives an identifier of the job scenario (basic job) to the basic job executing section 73, and instructs execution of the job scenario (basic job) indicated by the identifier.

Further, in the embodiment above, it is so configured that the identifier of the job scenario constituting the job is determined by the user service receiving section 81, and the execution order of each job scenario is determined by the user service executing section 82, and the job scenario and the execution order are given to the lower layer. However, in place of the user service receiving section 81 and the user service executing section 82, the job management section 71 may determine the identifier of the job scenario and the execution order of the job scenario, and give the same to the lower layer.

Furthermore, in the embodiment above, the notification job is generated by the job management section 71. However, in place of this, the user service receiving section 81 and the user service executing section 82 may generate the notification by using the job scenario (basic job).

Further, it is described that the OS 32 and the application are accommodated in the EEPROM 13E2. However, all of or a part of those may be accommodated in a separate storage device. For example, those may be accommodated in the HDD 14.

Further, the BIOS may include a boot-loader. In this case, the BIOS starts up the boot-loader in the step S3 shown in FIG. 17, and this starts up the OS 32.

Further, in FIG. 17, the OS 32 allocates data area in step S4. However, the data area allocation processing of S4 may be executed after the processing of step S5 is executed.

Further, as shown in FIG. 19, when there is no empty block, the resource management section 43 always determines a retreated block and retreats the block. However, in the case where there is no basic job using a plurality of blocks, it may determine that there is no retreated block, and terminate the processing without execution of the steps S12 and S13.

Further, according to the description with reference to FIG. 19, the resource management section 43 determines one retreated block and retreats the same. However, the resource management section 43 may determine a plurality of retreated blocks and retreat the same.

Furthermore, according to the description with reference to FIG. 19, the resource management section 43 allocates data area for each block unit. However, it may allocate data area not in unit of block but a group connecting non-consecutive empty areas. In this case, "the empty block" shown in FIG. 19 indicates "empty data area", and the "retreated block" indicates "retreated area."

The specific embodiment described above mainly includes the invention having the following configurations.

An operation control program in accordance with an aspect of the present invention allows a computer provided in an image forming apparatus to serve as: a service section which discriminates an operation of a service requested by a user, and constructs a job corresponding to the operation by selecting one or a plurality of scenarios prepared in advance as constituting element of the job and using the selected job scenario; and a job performing section for executing sequentially a processing indicated by each job scenario constituting the job constructed by the service section.

Further, according to the present invention, the operation control program serves as a storage section which stores the plurality of job scenarios, and controls a computer provided in the image forming apparatus to operate so that: the service section serves as: a job scenario selecting section which discriminates an operation requested by a user for operation and selects one or a plurality of job scenarios necessary for constituting a job associated with the operation from the job scenarios stored in the storage section; and a job constructing section which uses the job scenario selected by the job scenario selecting section to construct a job constituted by the job scenarios, and the job performing section serves as: a job management section which sequentially outputs an execution instruction of a processing indicated by each job scenario constituting the job constructed by the job constructing section; and a job executing section which sequentially executes a processing indicated by the instruction outputted from the job management section.

Further, according to the present invention, the operation control program controls the computer provided in the image forming apparatus to operate so that: the storage section stores the job scenario together with an identifier associated with each job scenario, and the job scenario selecting section specifies with the identifier the job scenario necessary for constituting a job corresponding to the operation, and the job constructing section constructs a job based on the identifier received from the job scenario selecting section, and the job management section sequentially outputs an execution instruction of a processing indicated by each job scenario corresponding to a respective identifier constituting the job.

Further, an operation control method in accordance with an aspect of the present invention includes an operation control method for operating an image forming apparatus provided with an instruction input section, an image input section, an image output portion, and an image processing section which processes an image inputted from the image input section and transfers the same to the image output portion, including the steps of: performing a service processing step of discriminating an operation of a service requested and inputted through the instruction input section by a user, constructing a job corresponding to the operation by selecting one or a plurality of job scenarios prepared in advance as constituting element of the job and using the selected job scenario; and performing a job performing step of executing sequentially a processing indicated by each job scenario constituting the job constructed in the service processing step.

Further, according to the operation control method of the present invention, the service processing step includes steps of: performing a job scenario selecting step of discriminating an operation requested by a user for operating and selecting one or a plurality of job scenarios necessary for constituting a job associated with the operation from the job scenarios stored in the storage section; and performing a job constructing step of using the job scenario selected in the job scenario selecting step to construct a job constituted by the job scenarios, and the job performing step includes steps of: performing a job management step of sequentially outputting an execution instruction of a processing indicated by each job scenario constituting the job constructed in the job constructing step; and performing a job executing step of sequentially executing a processing indicated by the instruction outputted in the job management step.

Further, an image forming apparatus in accordance with an aspect of the present invention includes: an instruction input section; an image input section; an image output portion; an image processing section which processes an image inputted from the image input section and transfers the same to the image output portion; and a controller for controlling an operation of the apparatus, wherein the controller includes: a service section which discriminates an operation of a service requested and inputted through the instruction input section by a user, constructing a job corresponding to the operation by selecting one or a plurality of job scenarios prepared in advance as constituting element of the job and using the selected job scenario; and a job performing section which executes sequentially a processing indicated by each job scenario constituting the job constructed by the service section.

Further, the image forming apparatus according to the present invention further includes: a storage section for storing a plurality of job scenarios, wherein the service section includes: a job scenario selecting section which discriminates an operation requested by a user for operation and selects one or a plurality of job scenarios necessary for constituting a job associated with the operation from the job scenarios stored in the storage section; and a job constructing section which uses the job scenario selected by the job scenario selecting section to construct a job constituted by the job scenarios, and the job performing section includes: a job management section which sequentially outputs an execution instruction of a processing indicated by each job scenario constituting the job constructed by the job constructing section; and a job executing section which sequentially executes a processing indicated by the instruction outputted from the job management section.

Further, in the image forming apparatus according to the present invention, the job performing section, in response to the job execution instruction from the service section, gives execution instruction regarding respective operations of an image input executed by the image input section, an image processing of the inputted image in the image processing section, and supply of the processed image to the image output portion.

According to the invention, one or a plurality of job scenarios prepared in advance as constituting elements of a job are used for constructing a job corresponding to an operation requested by a user as a service. Accordingly, the job scenario can be used effectively as a program which is functionally in common for use in an application which realizes a plurality of jobs.

Further, according to the invention, a job is constructed by the job scenario. Accordingly, without changing a design of a program of the job scenario, a new job (service) can be realized by combining a plurality of job scenarios. Therefore, it becomes easy to change a design of the application which realizes the job at a time of changing a job. Further, by adding the job scenario, a customized application including contents desired by a user can be easily created.

Further, a service request from a user is received by the service section, and a job is executed by the job executing section in accordance with a job scenario. Accordingly, even if the service section is provided above the job executing section, it is not necessary to provide a management section for a service such as a service execution order changing, so that changing and adding of a job can be made just by changing or adding a job scenario. Consequently, it becomes easy to change a design of an application which realizes a job while preventing a program configuration from being complex.

Further, according to the operation control program of the present invention, the operation control program controls the computer provided in the image forming apparatus to operate so that: the plurality of job scenarios stored in the storage section include the job scenario as a basic job commonly used for construction of plural kinds of jobs, and the job scenario selecting section, at a time of selecting the job scenario, selects the basic job or a combination of the basic job and other job scenario, and the job constructing section uses the basic job selected by the job scenario selecting section or the combination of the basic job and other job scenario to construct the job.

According to this invention, the basic job is used in common for constructing of a plurality of jobs. Accordingly, if the basic job is changed, two or more jobs including this can be changed, so that it becomes easy to change a design of an application in accordance with contents of a job.

Further, since various kinds of jobs can be easily created by just combining a plurality of basic jobs, it becomes easy to develop and change a design of a program.

Further, according to the operation control program of the present invention, the operation control program further controls the computer provided in the image forming apparatus to serve as: an element section for executing an operation control of each mechanism in the image forming apparatus in accordance with an instruction from the job executing section at a time of executing the basic job.

Further, according to the operation control method of the present invention, the plurality of job scenarios include the job scenario as a basic job commonly used for construction of plural kinds of jobs, and the job scenario selecting step selects, at a time of selecting the job scenario, selects the basic job or a combination of the basic job and other job scenario, and the job constructing step uses the basic job selected by the job scenario selecting step or the combination of the basic job and other job scenario to construct the job.

Further, according to the image forming apparatus of the present invention, the plurality of job scenarios stored in the storage section include the job scenario as a basic job commonly used for construction of plural kinds of jobs, and the job scenario selecting section, at a time of selecting the job scenario, selects the basic job or a combination of the basic job and other job scenario, and the job constructing section uses the basic job selected by the job scenario selecting section or the combination of the basic job and other job scenario to construct the job.

According to the invention, in the upper job executing section, a processing indicated by a basic job corresponding to a service request is instructed to be executed sequentially. Accordingly, the element section under the job executing section, even though it has a function of executing an operation control of each mechanism in the image forming apparatus in accordance with the processing indicated by a basic job, can realize a new job by combining a plurality of basic jobs without changing a design of the element section.

Accordingly, without making a program configuration be complex, it becomes easy to change a design of an application which realizes a job.

Further, the image forming apparatus of the present invention further includes an image data storage section for storing image data inputted by the image input section, wherein one of the basic job controls the image input means to input image and store the inputted image data into the image data storage section as a file.

According to this invention, a basic job is present which allows the image input section to input an image and store data of the inputted image data as a file into the image data storage section. Accordingly, operations such as (1) combining the basic job with, for example, a basic job of transmitting a file stored in the image data storage section through a mail to create a job of transmitting the inputted image data through a mail, and (2) combining the basic job with, for example, a basic job of printing a file stored in the image data storage section to create a job of printing the inputted image data, can be performed easily, so that it becomes easy to develop and change a design of an application which realizes a new job.

Further, the operation control program according to the present invention controls the computer provided in the image forming apparatus to operate so that: the basic job or the job scenario includes one or a plurality of job steps, and the job management section generates job information, which is a parameter necessary for execution of a job constructed with use of the job scenario by the job constructing section and has data construction which is common in each job corresponding to the operation, and stores the same in the storage section, and outputs an execution instruction of a processing indicated by the basic job or the job scenario constituting the constructed job to the job executing section, and the job executing section, at a time of executing the basic job or the job scenario in accordance with the execution instruction, outputs an execution instruction of each job step constituting the basic job or the job scenario and information read from the parameter included in the job information and being necessary for execution of each job step to the element section.

Further, the operation control program according to the present invention controls the computer provided in the image forming apparatus to operate so that: the storage section stores the basic job having the job steps of inputting an image from the image input section of the image forming apparatus, processing the input image, and supplying the processed image to the image output portion of the image forming apparatus.

Further, the operation control method according to the present invention further includes the steps of performing an element step of executing an operation control of each mechanism of the image forming apparatus in accordance with the instruction of the job executing step at a time of executing the basic job, wherein the basic job or the job scenario includes one or a plurality of job steps, and the job management step generates job information, which is a parameter necessary for execution of a job constructed with use of the job scenario by the job constructing section and has data structure which is common in each job corresponding to the operation, and stores the same in the storage section, and outputs an execution instruction of a processing indicated by the basic job or the job scenario constituting the constructed job to the job executing step, and the job executing step, at a time of executing the basic job or the job scenario in accordance with the execution instruction, outputs an execution instruction of each job step constituting the basic job or the job scenario and information read from the parameter included in the job information and being necessary for execution of each job step to the element section.

Further, according to the image forming apparatus of the present invention, the basic job or the job scenario includes one or a plurality of job steps, and the job management section generates job information, which is a parameter necessary for execution of a job constructed with use of the job scenario by the job constructing section and has data structure which is common in each job corresponding to the operation, and stores the same in the storage section, and outputs an execution instruction of a processing indicated by the basic job or the job scenario constituting the constructed job to the job executing section, and the job executing section, at a time of executing the basic job or the job scenario in accordance with the execution instruction, outputs an execution instruction of each job step constituting the basic job or the job scenario and information read from the parameter included in the job information and being necessary for execution of each job step to the element section.

According to the invention, the job executing section or the job executing step, at a time of executing the basic job or the job scenario in accordance with the execution instruction, outputs the execution instruction of each job step constituting the basic job or the job scenario and information necessary for execution of each job step read from the parameter included in the job information to the element section or the element step. Accordingly, without changing a design of a configuration necessary for the element section or the element step, a design of a function to be executed by the job executing section can be easily changed just by adding or changing a job step included in a job scenario constructed in the service section or the service step.

Further, the operation control program according to the present invention controls the computer provided in the image forming apparatus to further serve as: a middleware section having each controller which is under a control of the element section so as to control an operation of each mechanism of the image forming apparatus, wherein the element section, in accordance with a state notification of each mechanism received from each controller, outputs an operation control instruction based on each mechanism of the job step to the operation controller.

Further, the operation control program according to the present invention controls the computer provided in the image forming apparatus to operate so that: the storage section stores the basic job or the job scenario together with an identifier associated with each job scenario, and the job scenario selecting section specifies the basic job or the job scenario necessary for constituting a job corresponding to the operation by using the identifier, and the job constructing section constructs a job in accordance with the identifier received from the job scenario selecting section, and the job management section sequentially outputs execution instruction of a processing indicated by the basic job or the job scenario corresponding to each identifier constituting the job, and the job information includes an identifier for specifying the basic job or the job step constituting the job indicated by the job information, and the job executing section, in accordance with the identifier, reads from the job information the parameter corresponding to the job step constituting the basic job or the job scenario indicated by the identifier.

According to the invention, the element section, in accordance with a state notification of each mechanism received from the operation controller, outputs an operation control instruction of each mechanism based on the job step. Accordingly, in other words, an upper program part which is not dependent on a kind of an image forming apparatus among program parts which are incorporated as common parts to the conventional controller (for example, middleware layer) can be incorporated in to the operation control program according to the present invention and handled. Consequently, it becomes easier to change a design of an application which realizes a job.

Further, the operation control program according to the present invention controls the computer provided in the image forming apparatus to operate so that: the job scenario selecting section and the job scenario constructing section allows the job to include at least a first basic job and a second basic job, and the first basic job allows an image to be inputted from an image input section of the image forming apparatus and allows the image data storage section of the image forming apparatus to store the input image as image data, and the second basic job allows a facsimile transmitting section of the image forming apparatus to call out a facsimile receiver and, after the calling out of the facsimile receiver is successful, allows image data stored in the image data storage section to be transmitted.

Further, according to the operation control program of the present invention, the first basic job and the second basic job are used in common by the job scenario selecting section and the job scenario constructing section to construct a plurality of jobs.

Further, according to the operation control program of the present invention, the job scenario selecting step and the job scenario constructing step allows the job to include at least a first basic job and a second basic job, and allows an image to be inputted from an image input section of the image forming apparatus and allows the image data storage section of the image forming apparatus to store the input image as image data, and the second basic job allows a facsimile transmitting section of the image forming apparatus to call out a facsimile receiver and, after the calling out of the facsimile receiver is successful, allows image data stored in the image data storage section to be transmitted.

Further, according to the operation control method of the present invention, the first basic job and the second basic job are used in common by the job scenario selecting section and the job scenario constructing section to construct a plurality of jobs.

Further, according to the image forming apparatus of the present invention, the job scenario selecting section and the job scenario constructing section allows the job to include at least a first basic job and a second basic job, and the first basic job allows an image to be inputted from an image input section of the image forming apparatus and allows the image data storage section of the image forming apparatus to store the input image as image data, and the second basic job allows a facsimile transmitting section of the image forming apparatus to call out a facsimile receiver and, after the calling out of the facsimile receiver is successful, allows image data stored in the image data storage section to be transmitted.

Further, according to the image forming apparatus of the present invention, the image input section includes a communication section for communicating with an external equipment connected to the image forming apparatus to transmit data.

According to the invention, a facsimile job which has been conventionally programmed as one job is separated into a first basic job and a second basic job and constructed as one job by a combination of those. Accordingly, it becomes easy to grasp a configuration as a whole program, and program parts corresponding respectively to the basic jobs are simplified, so that an effect can be achieved in which a program related to the first basic job and a program related to the second basic job can be easily developed and changed in design.

Further, the job is constituted by a combination of the first basic job and the second basic job which are separated in a time sequence. Accordingly, in a case where a jam offers in the first basic job, execution of subsequent second basic job is not started, so that a wasteful processing due to starting of the second basic job can be prevented, so that it can achieve an effect of preventing a waste in use of a resource (each mechanism of an image forming apparatus).

Further, the operation control program according to the present invention controls the computer provided in the image forming apparatus to operate so that: the job management section generates job information, which is a parameter necessary for execution of a job constructed with use of the job scenario by the job constructing section and has data structure which is common in each job corresponding to the operation, and stores the same in the storage section, and outputs an execution instruction of a processing indicated by the basic job or the job scenario constituting the constructed job to the job executing section, and the job executing section receives the execution instruction from the job management section, refers to job information stored in the storage section, and uses the parameter to sequentially execute a processing indicated by the execution instruction outputted from the job management section.

Further, according to the operation control method of the present invention, the job management step generates job information which is a parameter necessary for execution of a job constructed by the job constructing step and having a data which is common in each job corresponding to the operation, and the job executing step refers to the job information and sequentially executes a processing indicated by the execution instruction outputted from the job management step.

Further, according to the image forming apparatus of the present invention, the job management section generates job information, which is a parameter necessary for execution of a job constructed with use of the job scenario by the job constructing section and has data structure which is common in each job corresponding to the operation, and stores the same in the storage section, and outputs an execution instruction of a processing indicated by the basic job or the job scenario constituting the constructed job to the job executing section, and the job executing section receives the execution instruction from the job management section, refers to job information stored in the storage section, and uses the parameter to sequentially execute a processing indicated by the execution instruction outputted from the job management section.

Conventionally, job information has been formatted separately for a kind of a job. According to the invention, the information is assembled as one data structure and has a data structure use in common for a kind of each job. Accordingly, between programs (for example, between the job management section and the job executing section) job information can be interchanged regardless of a kind of job. Accordingly, a program configuration can be prevented from being complex, so that it becomes easy to develop and change in a design of a program related to the image forming apparatus.

Further, the operation control program according to the present invention controls the computer provided in the image forming apparatus to operate so that: the job management section, at a time of outputting an execution instruction of a processing indicated by a job scenario constituting the constructed job to the job executing section, outputs an identifier of the generated job information together, and the job executing section reads and refers to the generated job information from the storage section in accordance with the identifier of the job information.

According to this invention, even in a case where respective portions are multi-layered for execution of a job and job information is transmitted between the layers as described above, contents of the job information is transmitted with use of an identifier of job information in stead of arguments, and the job executing section obtains contents of job information based on the identifier. Accordingly, the arguments used between the respective portions (between programs) can be reduced. Consequently, it becomes easy to develop and change in design of a program related to the image forming apparatus.

Further, the operation control program according to the present invention controls the computer provided in the image forming apparatus to operate so that: the job scenario selecting section includes a service request receiving section for determining whether or not a user requests execution of the operation, and a service specifying section for selecting the job scenario necessary for constituting a job corresponding to an operation which is requested by a user and received at the service request receiving section, and the computer further serves as a system management section for determining, in accordance with an authentication request from the service request receiving section at a time when a user's request is received at the service request receiving section, whether or not the user is a user who is permitted to execute the operation, and the service request receiving section, when the system management section determines that the user is a user who is authorized to execute the operation, controls the service specifying section to execute selection of the job scenario.

Further, according to the operation control method of the present invention, the job scenario selecting step includes a service request receiving step for determining whether or not a user requests execution of the operation, and a service specifying step for selecting the job scenario necessary for constituting a job corresponding to an operation which is requested by a user and received at the service request receiving section, and the operation control method further includes an authentication step for determining, in accordance with an authentication request from the service request receiving section at a time when a user's request is received in the service request receiving step, whether or not the user is a user who is permitted to execute the instruction, and the service specifying step, when it is determined in the authentication step that the user is a user who is permitted to execute the operation, selects the job scenario.

Further, according to the image forming apparatus of the present invention, the job scenario selecting section includes a service request receiving section for determining whether or not a user requests execution of the operation, and a service specifying section for selecting the job scenario necessary for constituting a job corresponding to an operation which is requested by a user and received at the service request receiving section, and the image forming apparatus further comprises: a system management section for determining, in accordance with an authentication request from the service request receiving section at a time when a user's request is received at the service request receiving section, whether or not the user is a user who is permitted to execute the operation, and the service request receiving section, when the system management section determines that the user is a user who is authorized to execute the operation, controls the service specifying section to execute selection of the job scenario.

According to this invention, the system management section takes a part of the user authentication function. Accordingly, the number of functional blocks and the number of layers in the application for realizing the job are reduced. Consequently, even if the respective portions (functional blocks) for executing the respective functions are multi-layered, and it can prevent a relationship between the respective parts (between programs realizing those) from being complex, so that it becomes easy to develop and change in design of a program.

Further, the operation control program according to the present invention controls the computer provided in the image forming apparatus to operate so that: the computer serves as an element section for controlling an operation of each mechanism of the image forming apparatus in accordance with an instruction outputted from the job executing section, and the service section, when execution of the operation is requested by a user, analyzes contents of the request, and in a case where the request requires constructing of the job, an instruction of executing the constructed job is outputted to the job performing section, or in a case where the request allows each mechanism of the image forming apparatus to operate without constructing of the job, an operation control instruction of the mechanism is outputted to the element section, and the element section controls operation of the mechanism in accordance with an operation control instruction from the job executing section or an operation control instruction from the service section.

Further, the operation control method according to the present invention further includes the step of: performing an element step of controlling operation of each mechanism of the image forming apparatus in accordance with an instruction outputted from the job executing section, wherein the service processing step, when execution of the operation is requested by a user, analyzes contents of the request, and the job performing step executes the constructed job in a case where the request requires constructing of the job, and the element step controls an operation of the mechanism in a case where the request allows each mechanism of the image forming apparatus to operate without constructing of the job, or controls an operation of the mechanism in accordance with an operation control instruction from the job executing step.

Further, the image forming apparatus according to the present invention further includes: an element section for controlling an operation of each mechanism of the image forming apparatus in accordance with an instruction outputted from the job performing section, wherein the service section, when execution of the operation is requested by a user, analyzes contents of the request, and in a case where the request requires constructing of the job, an instruction of executing the constructed job is outputted to the job performing section, or in a case where the request allows each mechanism of the image forming apparatus to operate without constructing of the job, an operation control instruction of the mechanism is outputted to the element section, and the element section controls operation of the mechanism in accordance with an operation control instruction from the job executing section or an operation control instruction from the service section.

Conventionally, in a case where a function block is multi-layered, a lower-layer function block is usually called out from an upper-layer function block through a middle-layer function block. However, according to the invention, for example, in a case where an operation of a mechanism of the image forming apparatus can be controlled without constructing of a job such as a data access, a lower-layer function block is directly called out from an upper-layer function block without a middle-layer function block. Accordingly, complexity in an application for realizing a job can be avoided, so that especially a configuration of the middle-layer function block can be simplified. This simplification achieves an effect of making it easy to develop and change in design of an application which realizes a job.

Further, the operation control program according to the present invention controls the computer provided in the image forming apparatus to operate so that: the computer serves as a resource management section positioned under the job performing section for managing each mechanism of the image forming apparatus, the job executing section, before executing the processing indicated by the job scenario, requests to the resource management section for use of the mechanism necessary for execution of the processing indicated by the job scenario, and executes the processing indicated by the job scenario after the mechanism is allocated by the resource management section for execution of the processing indicated by the job scenario.

Further, the operation control program according to the present invention controls the computer provided in the image forming apparatus to operate so that: the job management section, before outputting the execution instruction of the processing indicated by the job scenario to the job performing section, requests to the resource management section, which is positioned under the job executing section for managing each mechanism of the image forming apparatus, for use of the mechanism necessary for execution of the processing indicated by the job scenario, and outputs to the job executing section an execution instruction of the processing indicated by the job scenario after the resource management section allocates the mechanism for execution of the processing indicated by the job scenario.

Further, the operation control method according to the present invention further comprising the step of: performing a resource management step of managing each mechanism of the image forming apparatus, wherein the job performing step executes the processing indicated by the job scenario after the mechanism is allocated for execution of the processing indicated by the job scenario in the resource management step before executing the processing indicated by the job scenario.

Further, according to the image forming apparatus of the present invention, the job management section before outputting the execution instruction of the processing indicated by the job scenario to the job executing section, requests to the resource management section, which is positioned under the job executing section for managing each mechanism of the image forming apparatus, for use of the mechanism necessary for execution of the processing indicated by the job scenario, and outputs to the job executing section an execution instruction of the processing indicated by the job scenario after the resource management section allocates the mechanism for execution of the processing indicated by the job scenario.

In a conventional operation control program, at each time when each processing constituting a job is executed, a mechanism (hardware resource) necessary for execution is secured. Therefore, when a processing in a midstream is executed, and if the job is cancelled in a waiting state when a necessary hardware resource cannot be secured for execution of the processing, the processing executed till then has been wasted. However, according to the invention, a basic job is executed after all of hardware resource necessary for execution of each processing indicating a basic job is secured. Accordingly, even if the job is cancelled in the waiting state, none of the plurality of processing constituting the basic job is executed. Accordingly, wasteful execution of the processing can be avoided, and a memory resource for saving a job and processing is not exclusively occupied for storing of the wasteful processing, so that a memory resource can be used efficiently.

Further, since a job is constituted by a basic job or its combination, if an error occurs during execution of the basic job, the basic job which causes the error and subsequent basic job are not executed. Therefore, occurring of a wasteful processing due to starting of a subsequent basic job after the basic job which causes an error can be prevented.

Further, the operation control program according to the present invention controls the computer provided in the image forming apparatus to operate so that: the computer further serves as an element section for controlling an operation of each mechanism of the image forming apparatus in accordance with an instruction outputted from the upper job performing section, and the element section, in accordance with the operation control instruction from the job performing section, executes an error notification to the job performing section in a case where an operation error occurs in the mechanism at a time of controlling the mechanism, and the job performing section, when it receives the error notification, outputs a job aborting instruction to the element section.

Further, the operation control method according to the present invention further includes the step of executing an element step of controlling an operation of each mechanism of the image forming apparatus in accordance with an instruction outputted from the upper job performing section, wherein the element step, in accordance with the operation control instruction from the job performing section, executes an error notification to the job performing section in a case where an operation error occurs in the mechanism at a time of controlling the mechanism, and the job performing step, when the error notification is received, outputs a job aborting instruction to the element section.

Further, the image forming apparatus according to the present invention further includes: an element section for controlling an operation of each mechanism of the image forming apparatus in accordance with an instruction outputted from the upper job executing section, and the element section, in accordance with the operation control instruction from the job performing section, executes an error notification to the job performing section in a case where an operation error occurs in the mechanism at a time of controlling the mechanism, and the job performing section, when it receives the error notification, outputs a job aborting instruction to the element section.

According to this invention, even if portions (function blocks) for executing respective functions are multi-layered, a direction of a command between the multi-layered portions proceeds from an upper layer to a lower layer regardless of presence or absence of an error. Accordingly, complexity in relationship between the multi-layered portions can be avoided, so that it becomes easy to develop and change a design of a program.

Further, the operation control program according to the present invention controls the computer provided in the image forming apparatus to operate so that: the computer provided in the image forming apparatus further serves as: a system management section for managing a state of each mechanism of the image forming apparatus; an element section for controlling an operation of a notification section of the image forming apparatus in accordance with an instruction outputted from the job executing section; and a system service executing section for instructing execution of a job of allowing the notification section to give a notification of a state change in the mechanism or job to the job management section if it receives the state change in the mechanism or job from the system management section, wherein the job management section generates the job with use of the job scenario, and allows the job executing section to output an operation control instruction of giving a notification of a state change in the mechanism or job from the notifying section with use of the job to the element section.

Further, the operation control program according to the present invention further includes the steps of: performing a system management step of managing a state of each mechanism of the image forming apparatus; performing an element step of controlling an operation of a notification section of the image forming apparatus in accordance with an instruction outputted from the job executing step; and a system service executing step of instructing execution of a job of allowing the notification section to give a notification of a state change in the mechanism or job to the job management section if it receives the state change in the mechanism or job from the system management step, wherein the job management step generates the job with use of the job scenario, and allows the job executing step to output an operation control instruction of giving a notification of a state change in the mechanism or job from the notifying section with use of the job to the element step.

Further, the image forming apparatus according to the present invention further includes: a system management section for managing a state of each mechanism of the image forming apparatus; an element section for controlling an operation of a notification section of the image forming apparatus in accordance with an instruction outputted from the job executing section; and a system service executing section for instructing execution of a job of allowing the notification section to give a notification of a state change in the mechanism or job to the job management section if it receives the state change in the mechanism or job from the system management section, wherein the job management section generates the job with use of the job scenario, and allows the job executing section to output an operation control instruction of giving a notification of a state change in the mechanism or job from the notifying section with use of the job to the element section.

Conventionally, a notification regarding a mechanism of an image forming apparatus or a state information of a job is configured as a part of a job, for example, a part of a print job. However, according to this invention, the notification is configured as being independent of a normal job by a system service executing section, and executed as a notification job similarly to the normal job. Accordingly, a program for executing a normal job can be designed without a program related to the notification job, and a program configuration of the normal job can be simplified, so that it becomes easy to develop and change in design of a program.

Further, according to the invention, without including a job scenario related to the notification into the job scenario, the system management section or the system management step executes a job related to a notification separately from the job scenario in accordance with a state of equipment or a state of job related to the image forming apparatus. Accordingly, the number of combinations of the job scenario at a time of constructing a job can be reduced, so that it becomes easy to develop and change in design of a program.

Further, an image forming apparatus according to an aspect of the present invention includes: a memory in which a job data area is allocated; and a resource allocating section for allocating, in a case where a space of the job data area is equal to or smaller than a first predetermined amount, and before starting to execute a next job, an area having a second predetermined amount which is necessary for executing the next job and equal to or greater than the first amount in the area of the memory is allocated.

Further, a memory resource allocating method according to an aspect of the present invention is performed in an image forming apparatus provided with a memory in which a job data area is secured, wherein in a case where a space of the job data area is equal to or smaller than a first predetermined amount, and before starting execution of a next job, an area having a second predetermined amount which is necessary for executing the next job and is equal to or greater than the first amount in the area of the memory.

According to the invention, in a case where a space in a data area has an amount which is equal to or smaller than the first amount, and before execution of a next job, an area having the second amount, which is equal to or larger than the first amount which is necessary for execution of the next job, is allocated in an area of the memory. Accordingly, at the time of starting execution of the next job, lack of data area can be prevented, so that a memory resource can be used expeditiously.

Further, the image forming apparatus according to the present invention further includes: an auxiliary storage device, wherein the resource allocating section allows data stored in the area having the second amount to retreat to the auxiliary storage device and generates a space in the memory so as to allocate an area having the second amount in the area of the memory.

According to the invention, an empty area is generated in the memory by retreating data stored in the area having the second amount to the auxiliary storage device, and an area having the second amount is allocated in the memory area. Accordingly, data which has been already written in the area having the second amount can be prevented from being deleted.

Further, according to the image forming apparatus of the present invention, the resource allocating section allocates a part of the area in the memory as a data area for the job at a time of starting up the image forming apparatus.

Further, according to the image forming apparatus of the present invention, the resource allocating section, at a time of starting up the image forming apparatus, allocates the job data area in units of blocks in advance, and in a case where all the block is used for other processing, allocates an area having an amount necessary for execution of the job from used blocks in units of blocks.

According to the invention, at a time of starting up the image forming apparatus, a part of the memory area is allocated in advance as a job data area. Accordingly, even if a part of the area in the memory is used by an OS or an application for other purpose of use, a part of the memory area can be always used a job data area.

What is claimed:

1. An image forming apparatus comprising: an instruction input section; an image input section; an image output portion; an image processing section which processes an image inputted from the image input section and transfers the same to the image output portion; and a controller for controlling an operation of the apparatus, wherein
the controller includes:
a service section which discriminates an operation of a service requested and inputted through the instruction input section by a user, constructing a job corresponding to the operation by selecting one or a plurality of job scenarios prepared in advance as constituting element of the job and using the selected job scenario;

a job performing section which executes sequentially a processing indicated by each job scenario constituting the job constructed by the service section; and an element section for controlling an operation of each mechanism of the image forming apparatus in accordance with an instruction outputted from the job performing section, the element section, in accordance with the operation control instruction from the job performing section, executes an error notification to the job performing section in a case where an operation error occurs in the mechanism at a time of controlling the mechanism, and the job performing section, when it receives the error notification, outputs a job aborting instruction to the element section.

2. An image forming apparatus, comprising: an instruction input section; an image input section; an image output portion; an image processing section which processes an image inputted from the image input section and transfers the same to the image output portion; a storage section for storing a plurality of job scenarios and a controller for controlling an operation of the apparatus, wherein the controller includes:

a service section which discriminates an operation of a service requested and inputted through the instruction input section by a user, constructing a job corresponding to the operation by selecting one or a plurality of job scenarios prepared in advance as constituting element of the job and using the selected job scenario, the service section includes:

a job scenario selecting section which discriminates an operation requested by a user for operation and selects one or a plurality of job scenarios necessary for constituting a job associated with the operation from the job scenarios stored in the storage section; and a job constructing section which uses the job scenario selected by the job scenario selecting section to construct a job constituted by the job scenarios, and the controller further includes a job performing section which executes sequentially a processing indicated by each job scenario constituting the job constructed by the service section, the job performing section includes:

a job management section which sequentially outputs an execution instruction of a processing indicated by each job scenario constituting the job constructed by the job constructing section; and a job executing section which sequentially executes a processing indicated by the instruction outputted from the job management section.

3. The image forming apparatus according to claim 2, wherein the job performing section, in response to the job execution instruction from the service section, gives execution instruction regarding respective operations of an image input executed by the image input section, an image processing of the inputted image in the image processing section, and supply of the processed image to the image output portion.

4. The image forming apparatus according to claim 2, wherein the plurality of job scenarios stored in the storage section include the job scenario as a basic job commonly used for construction of plural kinds of jobs, and the job scenario selecting section, at a time of selecting the job scenario, selects the basic job or a combination of the basic job and other job scenario, and the job constructing section uses the basic job selected by the job scenario selecting section or the combination of the basic job and other job scenario to construct the job.

5. The image forming apparatus according to claim 4, further comprising:

an image data storage section for storing image data inputted by the image input section, wherein one of the basic job allows the image input section to input image and store the inputted image data into the image data storage section as a file.

6. The image forming apparatus according to claim 4, wherein the basic job or the job scenario includes one or a plurality of job steps, and the job management section generates job information, which is a parameter necessary for execution of a job constructed with use of the job scenario by the job constructing section and has data structure which is common in each job corresponding to the operation, and stores the same in the storage section, and outputs an execution instruction of a processing indicated by the basic job or the job scenario constituting the constructed job to the job executing section, and the job executing section, at a time of executing the basic job or the job scenario in accordance with the execution instruction, outputs an execution instruction of each job step constituting the basic job or the job scenario and information read from the parameter included in the job information and being necessary for execution of each job step to an element section.

7. The image forming apparatus according to claim 4, wherein the job scenario selecting section and the job constructing section allows the job to include at least a first basic job and a second basic job, and the first basic job allows an image to be inputted from an image input section of the image forming apparatus and allows the image data storage section of the image forming apparatus to store the input image as image data, and the second basic job allows a facsimile transmitting section of the image forming apparatus to call out a facsimile receiver and, after the calling out of the facsimile receiver is successful, allows image data stored in the image data storage section to be transmitted.

8. The image forming apparatus according to claim 7, wherein the image input section includes a communication section for communicating with an external equipment connected to the image forming apparatus to transmit data.

9. The image forming apparatus according to claim 2, wherein the job management section generates job information, which is a parameter necessary for execution of a job constructed with use of the job scenario by the job constructing section and has data structure which is common in each job corresponding to the operation, and stores the same in the storage section, and outputs an execution instruction of a processing indicated by the basic job or the job scenario constituting the constructed job to the job executing section, and the job executing section receives the execution instruction from the job management section, refers to job information stored in the storage section, and uses the parameter to sequentially execute a processing indicated by the execution instruction outputted from the job management section.

10. The image forming apparatus according to claim 2, wherein
the job scenario selecting section includes a service request receiving section for determining whether or not a user requests execution of the operation, and a service specifying section for selecting the job scenario necessary for constituting a job corresponding to an operation which is requested by a user and received at the service request receiving section, and
the image forming apparatus further comprises: a system management section for determining, in accordance with an authentication request from the service request receiving section at a time when a user's request is received at the service request receiving section, whether or not the user is a user who is permitted to execute the operation, and
the service request receiving section, when the system management section determines that the user is a user who is authorized to execute the operation, allows the service specifying section to execute selection of the job scenario.

11. The image forming apparatus according to claim 2, wherein
the job management section, requests to the resource management section, which is positioned under the job performing section for managing each mechanism of the image forming apparatus, for use of the mechanism necessary for execution of the processing indicated by the job scenario, and outputs to the job executing section an execution instruction of the processing indicated by the job scenario after the resource management section allocates the mechanism for execution of the processing indicated by the job scenario.

12. The image forming apparatus according to claim 2, further comprising:
an element section for controlling an operation of each mechanism of the image forming apparatus in accordance with an instruction outputted from the upper job executing section, and
the element section, in accordance with the operation control instruction from the job performing section, executes an error notification to the job performing section in a case where an operation error occurs in the mechanism at a time of controlling the mechanism, and
the job performing section, when it receives the error notification, outputs a job aborting instruction to the element section.

13. The image forming apparatus according to claim 2, further comprising:
a system management section for managing a state of each mechanism of the image forming apparatus;
an element section for controlling an operation of a notification section of the image forming apparatus in accordance with an instruction outputted from the job executing section; and
a system service executing section for instructing execution of a job of allowing the notification section to give a notification of a state change in the mechanism or job to the job management section if it receives the state change in the mechanism or job from the system management section, wherein
the job management section generates the job with use of the job scenario, and allows the job executing section to output an operation control instruction of giving a notification of a state change in the mechanism or job from the notifying section with use of the job to the element section.

14. An image forming apparatus, comprising: an instruction input section; an image input section; an image output portion; an image processing section which processes an image inputted from the image input section and transfers the same to the image output portion; and a controller for controlling an operation of the apparatus, wherein
the controller includes:
a service section which discriminates an operation of a service requested and inputted through the instruction input section by a user, constructing a job corresponding to the operation by selecting one or a plurality of job scenarios prepared in advance as constituting element of the job and using the selected job scenario; and
a job performing section which executes sequentially a processing indicated by each job scenario constituting the job constructed by the service section;
an element section for controlling an operation of each mechanism of the image forming apparatus in accordance with an instruction outputted from the job performing section, wherein
the service section, when execution of the operation is requested by a user, analyzes contents of the request, and in a case where the request requires constructing of the job, an instruction of executing the constructed job is outputted to the job performing section, or in a case where the request allows each mechanism of the image forming apparatus to operate without constructing of the job, an operation control instruction of the mechanism is outputted to the element section, and
the element section controls operation of the mechanism in accordance with an operation control instruction from the job performing section or an operation control instruction from the service section.

* * * * *